(12) United States Patent
Silver et al.

(10) Patent No.: US 7,997,985 B2
(45) Date of Patent: Aug. 16, 2011

(54) INTERACTIVE INTER-CHANNEL GAME

(75) Inventors: Yonatan Silver, Jerusalem (IL); Carmi Bogot, Maaleh Adumim (IL); Shabtai Atlow, Efrat (IL)

(73) Assignee: NDS Limited, Staines, Middlesex (GB)

( * ) Notice: Subject to any disclaimer, the term of this patent is extended or adjusted under 35 U.S.C. 154(b) by 964 days.

(21) Appl. No.: 11/977,821

(22) Filed: Oct. 25, 2007

(65) Prior Publication Data

US 2008/0076555 A1 Mar. 27, 2008

Related U.S. Application Data

(63) Continuation of application No. 10/489,794, filed as application No. PCT/IL03/00543 on Jun. 29, 2003, now Pat. No. 7,306,522.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........... 463/31; 463/16; 463/30; 463/35; 463/37; 463/40; 463/42

(58) Field of Classification Search .......... 463/16, 463/30, 31, 35, 37, 40, 42
See application file for complete search history.

(56) References Cited

U.S. PATENT DOCUMENTS

| | | | |
|---|---|---|---|
| 4,372,554 A | 2/1983 | Orenstein | |
| 4,918,516 A | 4/1990 | Freeman | |
| 5,271,626 A | 12/1993 | Lienas et al. | |
| 5,526,035 A | 6/1996 | Lappington et al. | |
| 5,673,401 A | 9/1997 | Volk et al. | |
| 5,697,844 A * | 12/1997 | Von Kohorn | 463/40 |
| 5,936,661 A * | 8/1999 | Trew | 725/114 |
| 6,227,974 B1 | 5/2001 | Eilat et al. | |
| 6,359,661 B1 | 3/2002 | Nickum | |
| 6,526,577 B1 * | 2/2003 | Knudson et al. | 725/40 |
| 6,609,976 B1 | 8/2003 | Yamagishi et al. | |
| 6,657,628 B1 * | 12/2003 | Cook | 345/473 |
| 6,692,358 B2 * | 2/2004 | Stevens et al. | 463/39 |
| 6,772,335 B2 | 8/2004 | Curtis et al. | |
| 7,027,716 B1 * | 4/2006 | Boyle et al. | 386/200 |

(Continued)

FOREIGN PATENT DOCUMENTS

WO WO 02/098044 A2 12/2002

OTHER PUBLICATIONS

Jan. 5, 2009 Office Action for IL 172 292.

(Continued)

*Primary Examiner* — David L Lewis
*Assistant Examiner* — Adetokunbo Torimiro
(74) *Attorney, Agent, or Firm* — Husch Blackwell LLP

(57) ABSTRACT

An interactive multi-channel game method is described. The method includes providing a first representation of a game element associated with a first channel of a multi-channel system, replacing the first representation with a second representation of the game element associated with a second channel of the multi-channel system, providing a clue associated with the second channel, and receiving a user input representing a user's response to the clue. Related apparatus and methods are also described.

25 Claims, 18 Drawing Sheets

U.S. PATENT DOCUMENTS

| | | |
|---|---|---|
| 2001/0047518 A1 | 11/2001 | Sahota et al. |
| 2002/0010589 A1 | 1/2002 | Nashida et al. |
| 2002/0056094 A1 | 5/2002 | Dureau |
| 2002/0112250 A1 | 8/2002 | Koplar et al. |
| 2002/0124249 A1 | 9/2002 | Shintani et al. |
| 2002/0129362 A1 | 9/2002 | Chang et al. |
| 2002/0133817 A1 | 9/2002 | Markel |
| 2002/0144273 A1 | 10/2002 | Reto |
| 2002/0155878 A1 | 10/2002 | Lert, Jr. et al. |
| 2002/0162117 A1 | 10/2002 | Pearson et al. |

OTHER PUBLICATIONS

Handford, Martin, Where's Waldo? (Candlewick Press 1987) (title page, copyright page, and first two pages as exemplary pages).

Bonzi Buddy website found at www.bonzi.com/bonzibuddy/bonzibuddyfreehorn.asp on Mar. 23, 2003.

Sep. 17, 2009 Office Communication in connection with prosecution of AU 2003238661.

Aug. 31, 2009 Office Communication in connection with prosecution of KR 10-2005-7025046.

* cited by examiner

FIG. 1A
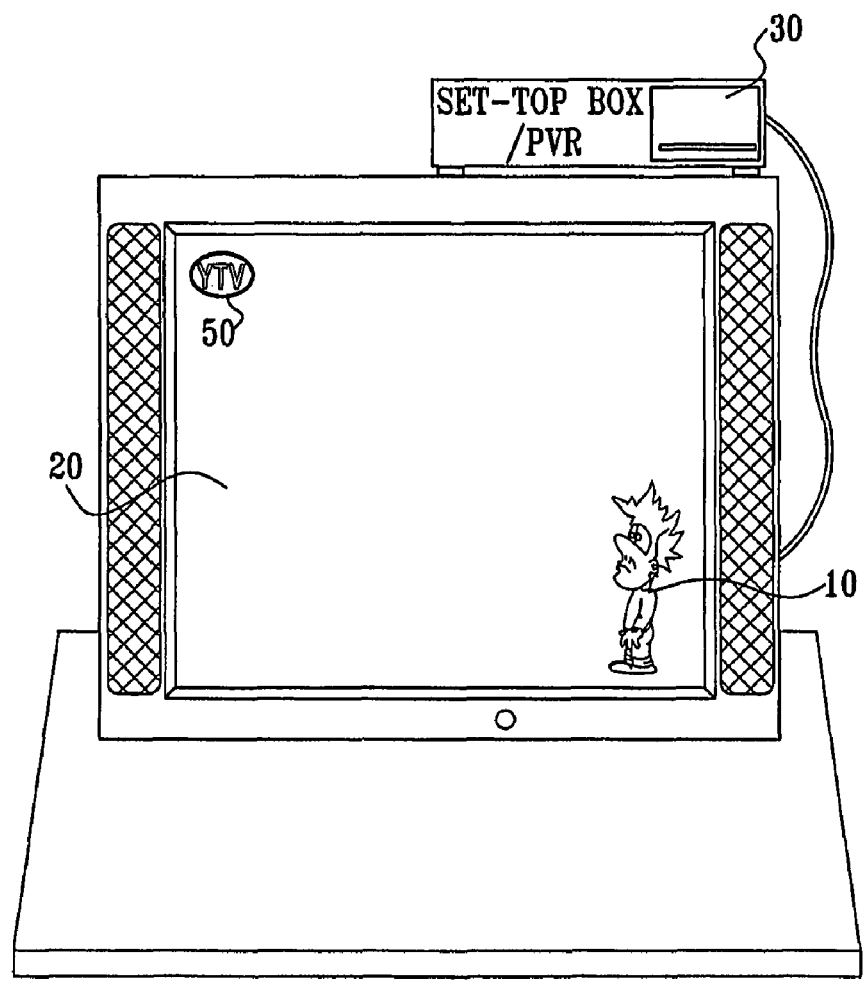
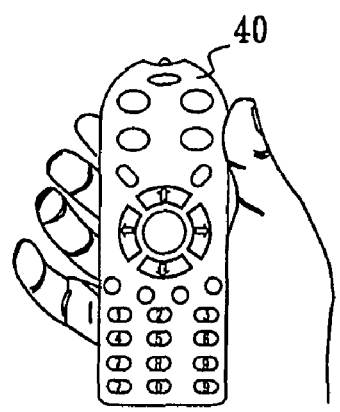

FIG. 1C
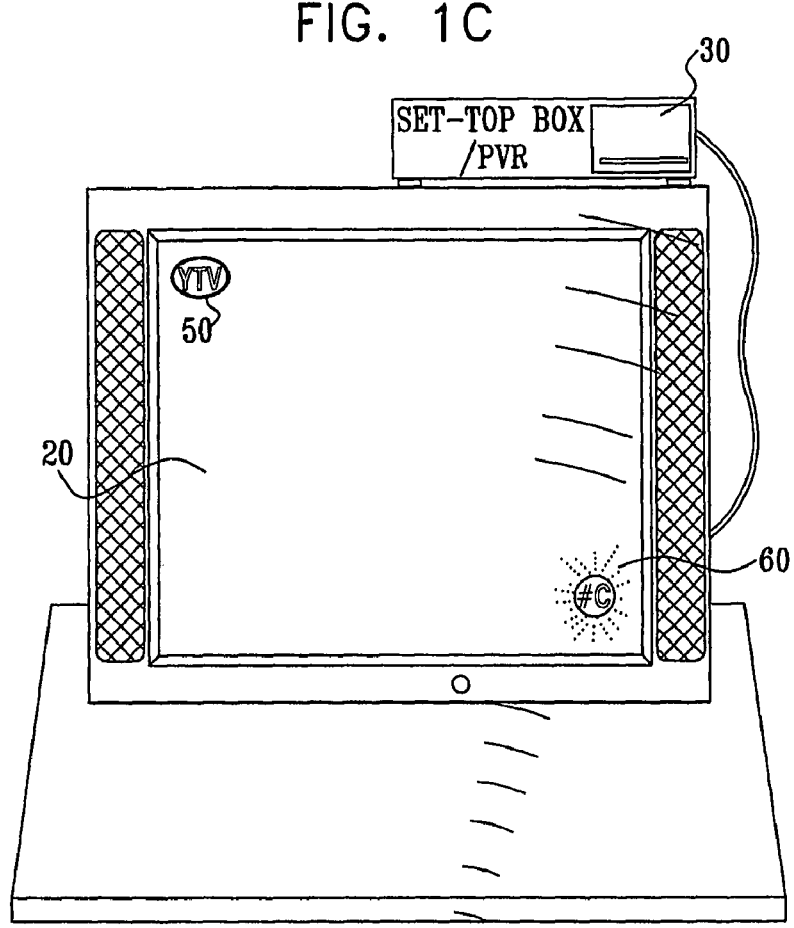
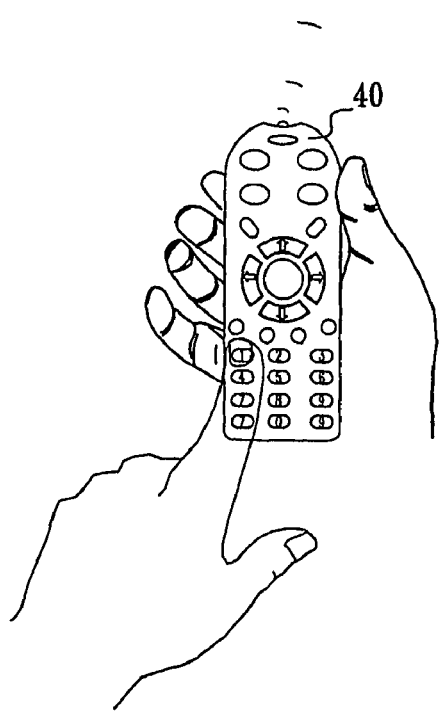

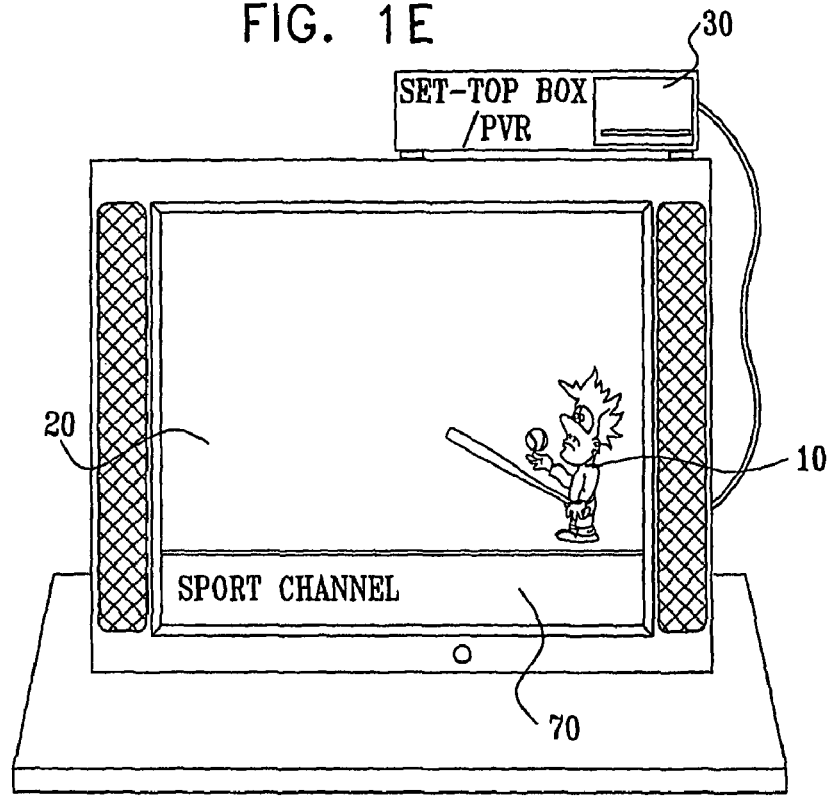
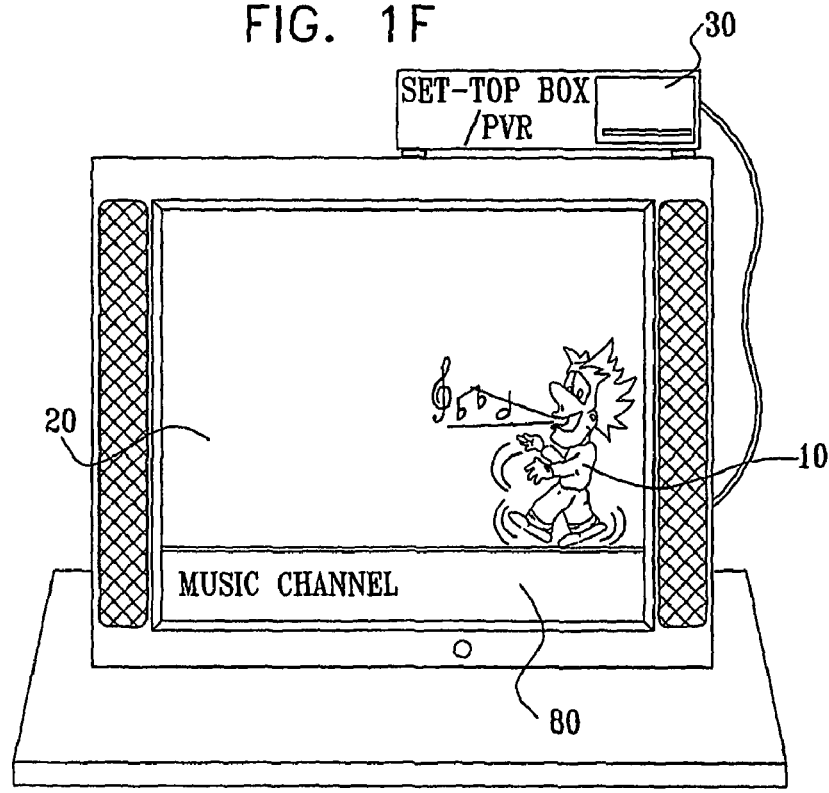

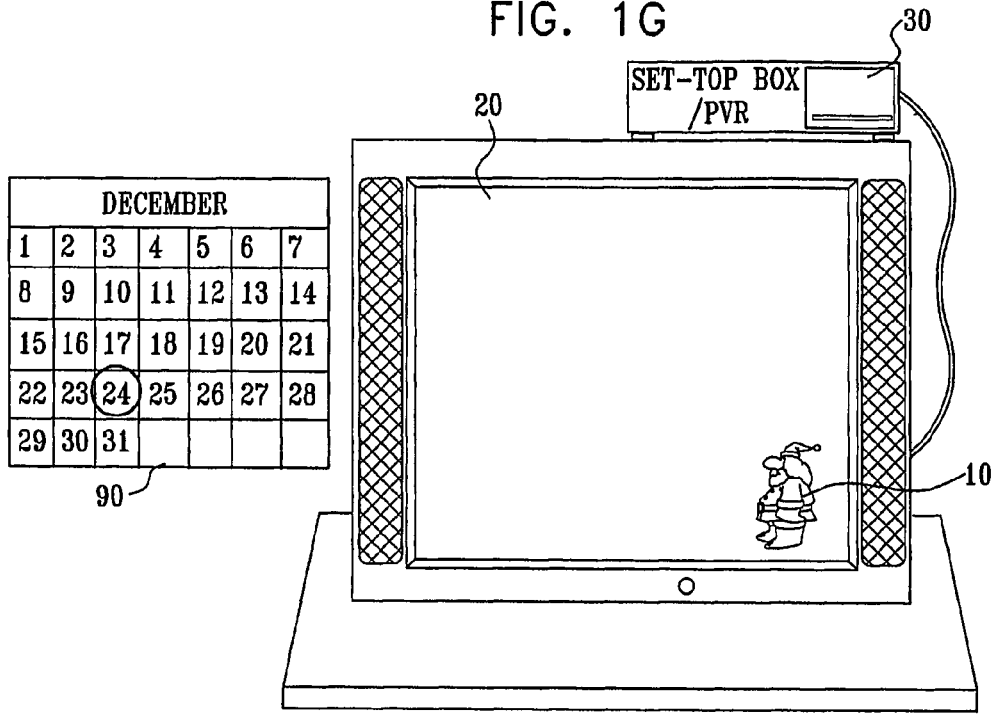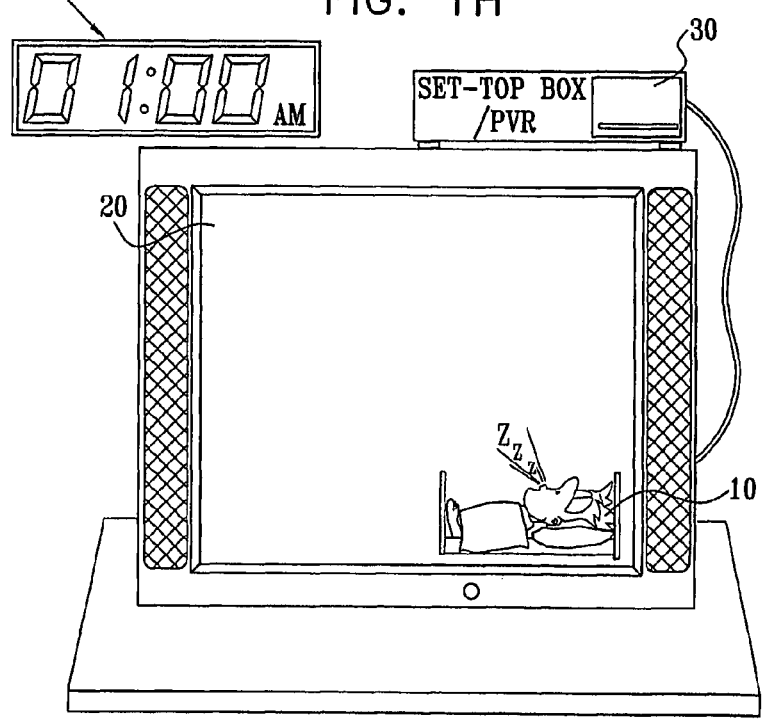

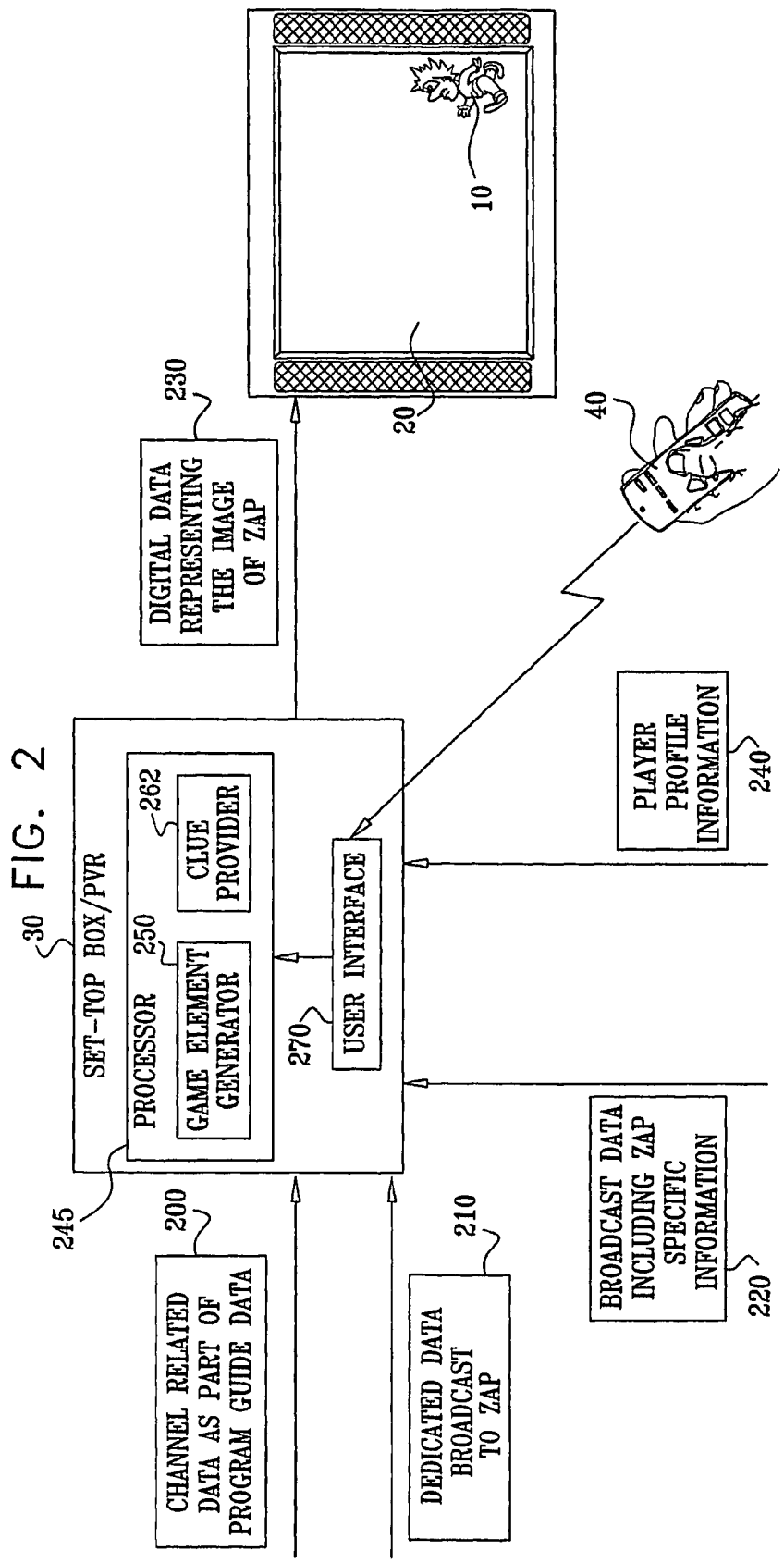

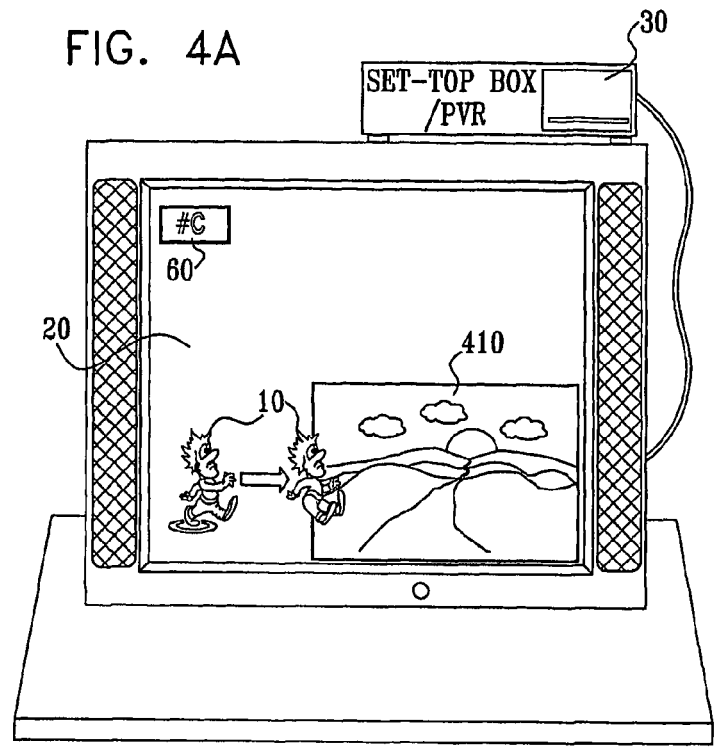
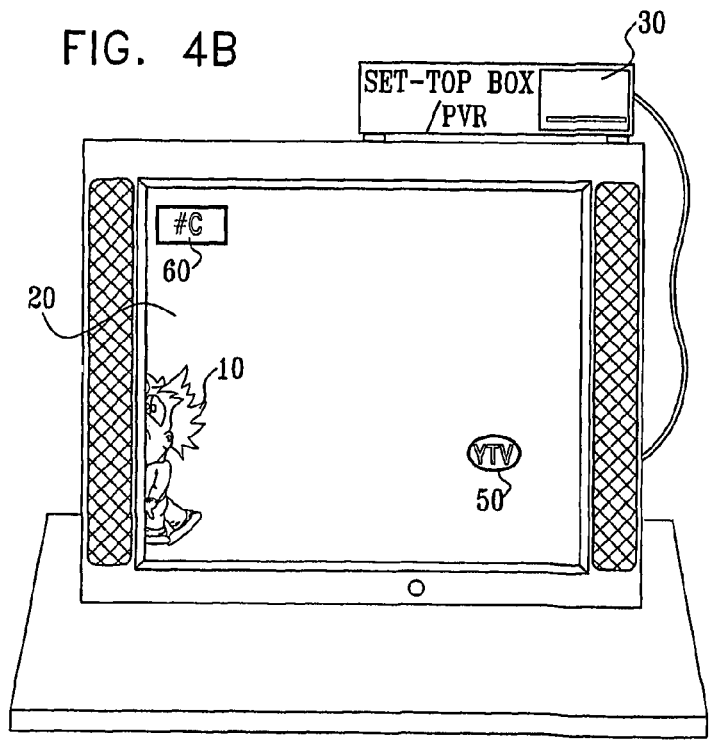

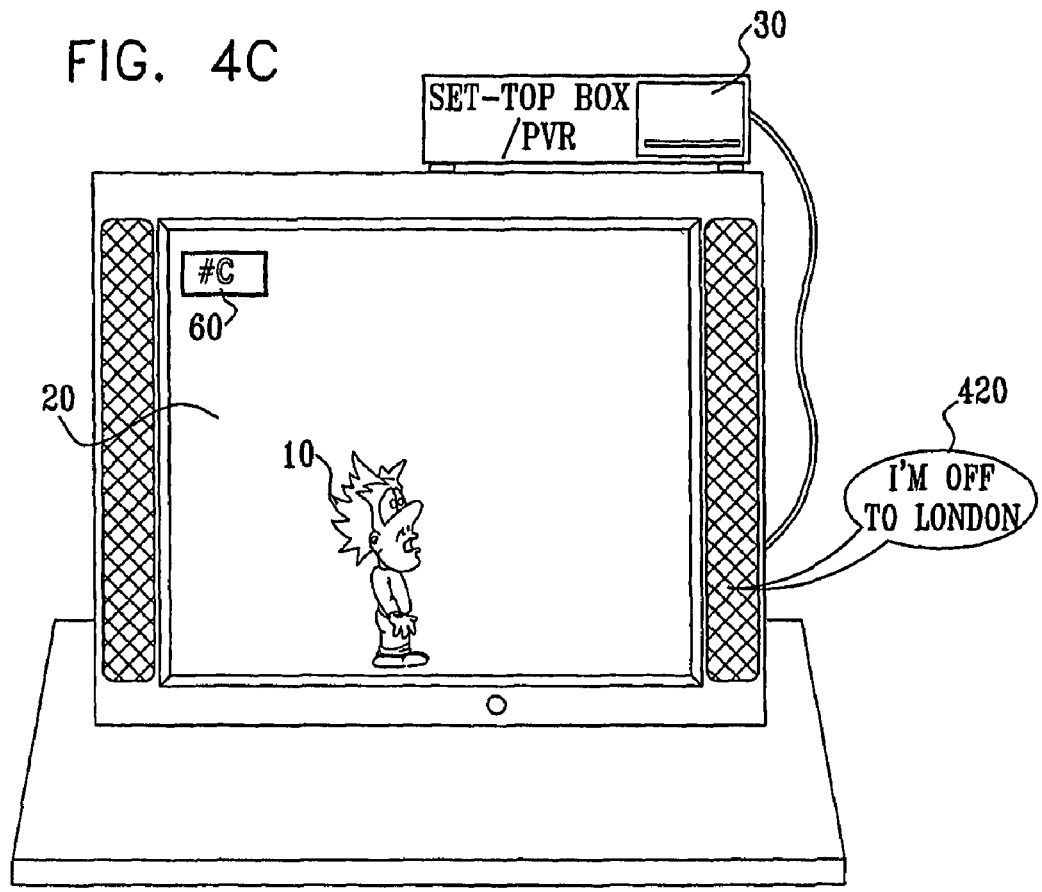

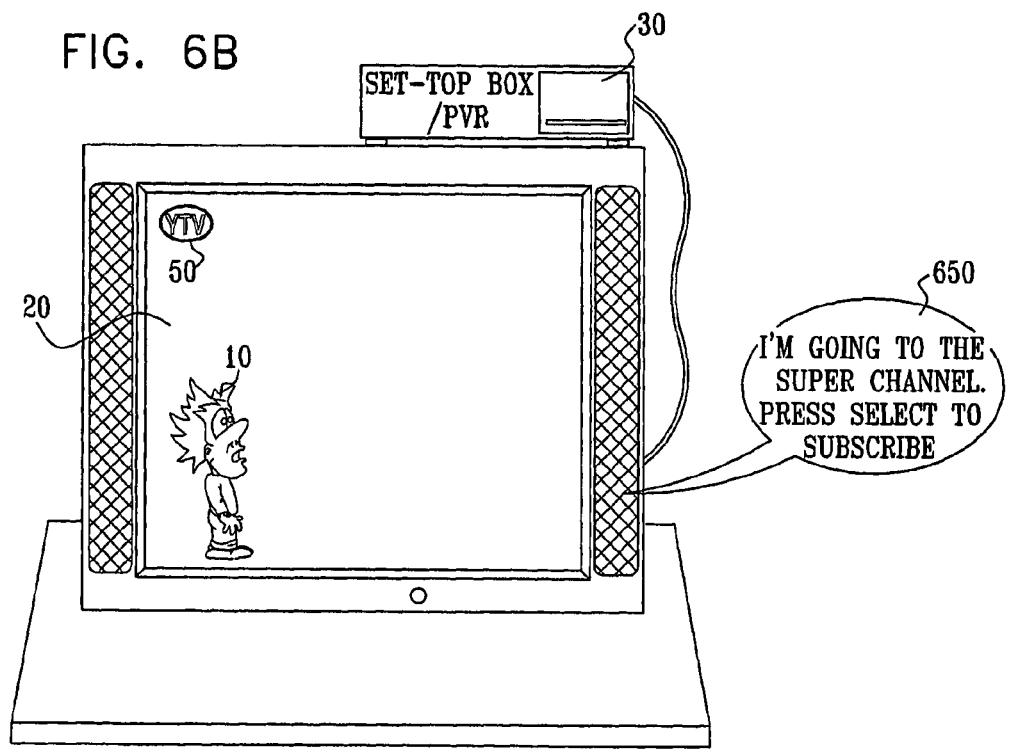

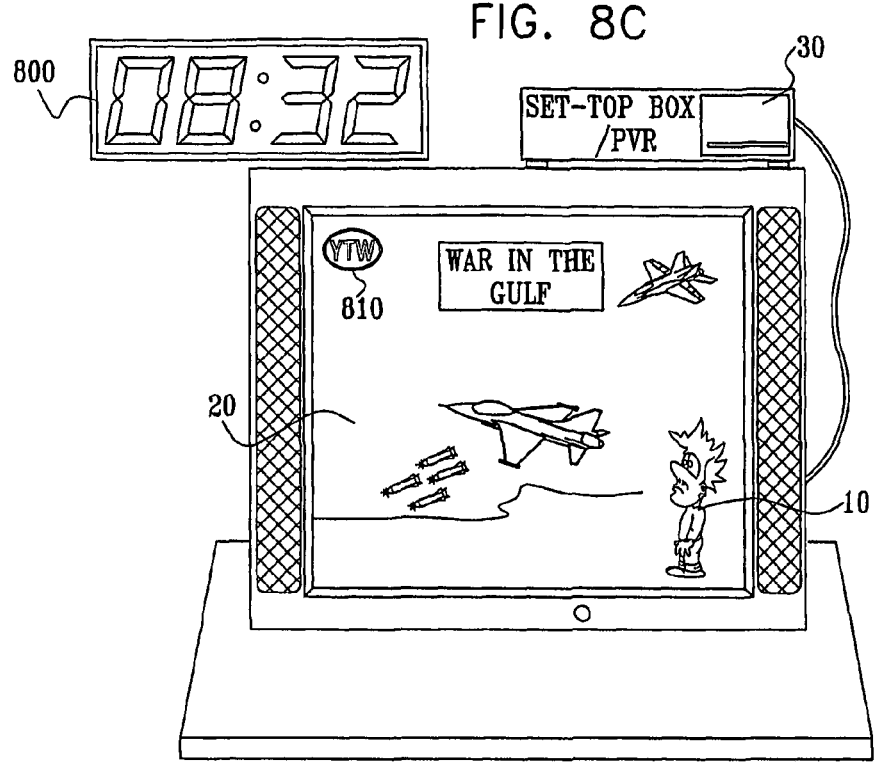
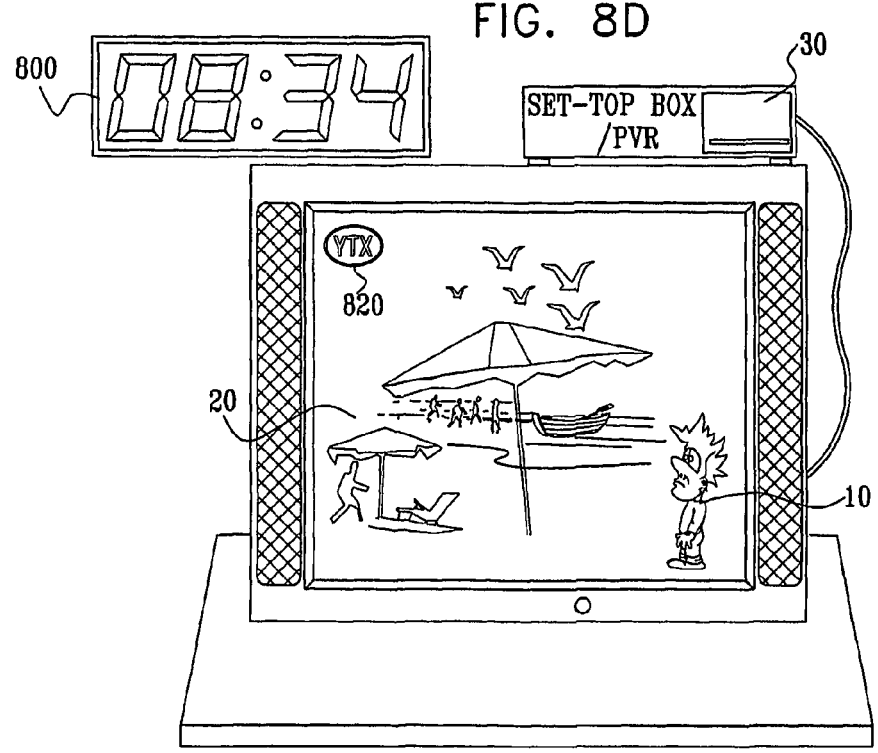

INTERACTIVE INTER-CHANNEL GAME

The present application is a continuation application of presently allowed application Ser. No. 10/489,794, now U.S. Pat. No. 7,306,522, which is a 35 USC §371 application of PCT/IL03/00543, filed on 29 Jun. 2003 and entitled "Interactive Inter-Channel Game".

FIELD OF THE INVENTION

The present invention relates to games and more particularly, but not exclusively, to games played using a remote control, such as while watching television.

BACKGROUND OF THE INVENTION

The *Where's Wally* series of children's books by Handford Martin has a game in which the reader has to locate a cartoon character in various crowded scenes.

One can download from the Internet a character, Bonzi, who will "explore the Internet with you as your very own friend and sidekick! He can talk, walk, joke, browse, search, e-mail, and download like no other friend you've ever had! He even has the ability to compare prices on the products you love and help you save money!" BonziBuddy is available for download (as of 26 Jun. 2003) at www.bonzi.com/bonzi-buddy/bonzibuddyfreehom.asp.

The concept of On Screen Displays (OSDs) is well known in the art as a method for conveying information to a television viewer in a pop-up window. Also well known to persons skilled in the art is the idea of Picture in Picture, in which video is displayed in a window on a television screen used for other purposes, such as, for example, displaying one channel in one window and displaying a second channel in a second window.

US Published Patent Application 2002/0056094 of Dureau describes an interactive television system configured to display an animated character which has an appearance indicative of a viewer's interaction and time spent watching a particular television program.

U.S. Pat. No. 6,227,974 to Eilat, et al describes a gaming method for use with an interactive game, which is played at a player unit having an interface device, which is coupled to a television and to at least one communication network. The method of Eilat et al includes transferring a picture of the player to the headend, assembling an avatar based on that picture, electronically assimilating the avatar into the interactive game and enabling the player to interactively play the interactive game by controlling the avatar via the communication network.

Published PCT Patent Application WO 01/52541 of NDS Limited discloses a system for advertisements in an end-user controlled playback environment.

US Published Patent Application 2001/0047518 of Sahota et al teaches a method and system to provide interactivity using an interactive "channel bug" (for example, an interactive broadcast channel branding logo) allowing a television viewer to access a variety of interactive services.

US Published Patent Application US 2002/0155878 of Lert Jr., et al, disclose a system and method for engaging consumers in interactive, screen based games that include brand images as an intrinsic element of the games.

The following references are also believed to be indicative of the state of the art:

US Published Patent Application 2002/0144273 of Reto;
US Published Patent Application 2002/0112250 of Koplar et al;
US Published Patent Application 2002/0162117 of Pearson, et al;
US Published Patent Application 2002/0133817 of Markel;
US Published Patent Application 2002/0124249 of Shintani, et al;
US Published Patent Application 2002/0010589 of Nashida, et al;
U.S. Pat. No. 5,673,401 to Volk, et al. and
US Published Patent Application 2002/0129362 of Chang, et al.

The disclosures of all references mentioned above and throughout the present specification are hereby incorporated herein by reference.

SUMMARY OF THE INVENTION

The present invention seeks to provide an improved interactive multi-channel game.

Certain preferred embodiments of the present invention are now briefly described.

The game may preferably be used to direct viewers to specific events, channels or advertisements.

When the game is activated, a character, called, for the purposes of the present specification, "Zap", appears on the television screen, overlaid on the channel being viewed. It is appreciated that Zap may not appear at all as perceptible to the naked eye, but may alternatively comprise any appropriate combination of voice-over or sound/visual/textual effects. Additionally or alternatively, the display may flash brighter and darker, or black and white, or any other suitable combination of colors. For the sake of ease of description, and without limiting the generality of the present invention, mainly visual terms are used throughout the present specification.

Zap has the ability to jump between channels. For example, Zap preferably makes an exit from a first channel, for example, channel 10. Zap preferably reappears on one or more second channels, for example, channel 131 among the one or more second channels. A user will therefore have to switch from channel 10 to channel 131 in order to continue to see Zap.

Prior to, during and/or after Zap leaves a channel, a clue may preferably be provided to the user or users, by any suitable method perceptible to human senses, as to Zap's next destination.

In certain preferred embodiments of the present invention, the user is awarded for speed and accuracy in following Zap around the various channels. There may also be a time limit placed on the duration of the game. Additionally or alternatively, points may be deducted for errors such as lack of speed and lack of accuracy. In one embodiment, points may sometimes be awarded in the form of time allocated to play the game. That is, in such an embodiment, references to awarding of points may sometimes correspond to allocating additional playing time to the user, and references to a deduction of points may sometimes correspond to reducing the amount of time remaining for playing the game.

A prize may preferably be offered for achieving a certain number of points, or in multi-player games, for achieving the most points. For example, and without limiting the generality of the foregoing, prizes may comprise credit towards pay-per-view purchases, authorizations to view special broadcasts or channels, extension of rental time for PVR recorded content, or other items of commercial value, as are known in the art. Additionally or alternatively users could be given an initial number of points, with the aim being to retain as many points as possible, or the game could continue until all points are spent. In one preferred embodiment of the game, the winner is the user who takes the longest time to use up all of his points or who has retained the greatest number of points at the end of the game.

It is appreciated that the use of television for the "Zap" game is purely by way of example, and that such a game may be played on the Internet as well, wherein URLs would preferably be used in place of television channels. When playing the Zap game over the Internet, keyboards, mice and other appropriate computer input devices would be used instead of set-top box/PVR remote controls. In the context of an Internet based embodiment of the Zap game, a Zap game server would replace the broadcast headend. Multiple users would play on more than one computer, each computer connecting to the central Zap game server. Therefore, it is understood throughout the present specification and claims that references to channel are to be understood as including URLs.

In light of the foregoing, the term "channel" is used throughout the present specification and claims to include any appropriate media a viewer may access on a television via a remote control, or as an Internet URL. For example, and without limiting the generality of the foregoing, the term "channel" may preferably include any of the following: a regular viewing channel, an interactive viewing channel, a PVR based channel, a program guide, or any other appropriate media.

The term "render" is used, in all of its grammatical forms, throughout the present specification and claims to refer to any appropriate mechanism or method of making content palpable to one or more of the senses. In particular and without limiting the generality of the foregoing, "render" refers not only to display of video content but also to playback of audio content.

Both of the terms "user" and "player" are used interchangeably, in all of their grammatical forms, throughout the present specification and claims to refer to a player or players of the Zap game.

There is thus provided in accordance with a preferred embodiment of the present invention an interactive multi-channel game method including providing a first representation of a game element associated with a first channel of a multi-channel system, replacing the first representation with a second representation of the game element associated with a second channel of the multi-channel system, providing a clue associated with the second channel, and receiving a user input representing a user's response to the clue.

Further in accordance with a preferred embodiment of the present invention the second representation includes a plurality of representations, and the second channel includes a plurality of channels, and each of the plurality of representations is associated with one of the plurality of channels.

Still further in accordance with a preferred embodiment of the present invention the second representation includes a plurality of representations, and the second channel includes a plurality of channels, each channel including content, and each of the plurality of representations is associated with particular content.

Additionally in accordance with a preferred embodiment of the present invention the multi-channel system includes a multi-channel television system.

Moreover in accordance with a preferred embodiment of the present invention the multi-channel system includes an Internet-based system.

Further in accordance with a preferred embodiment of the present invention each channel is associated with a URL.

Still further in accordance with a preferred embodiment of the present invention at least one of the first representation and the second representation is rendered sensible to at least one human sense.

Additionally in accordance with a preferred embodiment of the present invention at least one of the first representation and the second representation is rendered visually.

Moreover in accordance with a preferred embodiment of the present invention at least one of the first representation and the second representation is rendered audibly.

Further in accordance with a preferred embodiment of the present invention at least one of the first representation and the second representation is rendered audio-visually.

Still further in accordance with a preferred embodiment of the present invention the clue is rendered sensible to at least one human sense.

Additionally in accordance with a preferred embodiment of the present invention the clue is rendered visually.

Moreover in accordance with a preferred embodiment of the present invention the clue is rendered audibly.

Further in accordance with a preferred embodiment of the present invention the clue is rendered audio-visually.

Still further in accordance with a preferred embodiment of the present invention the receiving a user input includes receiving a plurality of user inputs from a plurality of users, each of the plurality of user inputs representing a response of a corresponding user of the plurality of users to the clue.

Additionally in accordance with a preferred embodiment of the present invention the method also includes awarding at least one point based, at least in part, on performance of a first user of the plurality of users compared to performance of a second user of the plurality of users.

Moreover in accordance with a preferred embodiment of the present invention the user input includes a channel change signal from the user.

Preferably, the at least one point is awarded when the user changes to the correct channel.

Alternatively or additionally, the at least one point is awarded for user speed in changing to the correct channel.

Additionally in accordance with a preferred embodiment of the present invention the method also includes deducting at least one point for incorrect channel changes.

Moreover in accordance with a preferred embodiment of the present invention the method also includes deducting at least one point for lack of speed.

Further in accordance with a preferred embodiment of the present invention the method also includes pausing the game based at least in part on a received user input.

Still further in accordance with a preferred embodiment of the present invention the method also includes providing another clue based at least in part on received user input.

Additionally in accordance with a preferred embodiment of the present invention the method also includes passing the current turn based at least in part on received user input.

Moreover in accordance with a preferred embodiment of the present invention at least one characteristic of the provided clue depends on the time of day.

Further in accordance with a preferred embodiment of the present invention at least one characteristic of the provided clue depends on a period in the year.

Still further in accordance with a preferred embodiment of the present invention at least one of the following depends on a user profile behavior of the represented game element: the replacing the first representation game element with the second representation of the game element, the clue, and the response to the input of at least one of the plurality of users.

Additionally in accordance with a preferred embodiment of the present invention the second channel is selected from among a plurality of channels which at least one of the plurality of users is authorized to view.

Moreover in accordance with a preferred embodiment of the present invention the second channel is selected from among a plurality of channels at least one of the plurality of users is not authorized to view.

Further in accordance with a preferred embodiment of the present invention the second channel is selected from among a plurality of channels at least one of the plurality of users is not authorized to view, and the method also includes offering a subscription to the second channel.

Still further in accordance with a preferred embodiment of the present invention the providing a clue includes receiving information from a broadcast headend, and displaying the clue based, at least in part, on the information.

Additionally in accordance with a preferred embodiment of the present invention the providing a clue includes receiving information from broadcast program guide information, and displaying the clue based, at least in part, on the information.

Moreover in accordance with a preferred embodiment of the present invention the providing a clue includes receiving information from at least one broadcast program, and displaying the clue based, at least in part, on the information.

Further in accordance with a preferred embodiment of the present invention the providing a clue includes receiving information from broadcast data, and displaying the clue based, at least in part, on the information.

Still further in accordance with a preferred embodiment of the present invention the replacing includes at least one of the following: fade in, and fade out.

Additionally in accordance with a preferred embodiment of the present invention the replacing includes the game element appearing to walk off a display of a display device.

Moreover in accordance with a preferred embodiment of the present invention the replacing includes the game element entering a picture within a picture.

Further in accordance with a preferred embodiment of the present invention the game element appears on at least one of the first channel and the second channel for a variable amount of time.

Still further in accordance with a preferred embodiment of the present invention the game element interacts with the clue.

Additionally in accordance with a preferred embodiment of the present invention the method also includes receiving a payment for playing the game, wherein the payment is received from the user.

Moreover in accordance with a preferred embodiment of the present invention the method includes receiving a payment in exchange for associating the game element with designated content.

Further in accordance with a preferred embodiment of the present invention the payment is received from a payer, and the designated content is associated with the payer.

Still further in accordance with a preferred embodiment of the present invention the payer includes a content provider and the designated content is provided by the content provider.

Additionally in accordance with a preferred embodiment of the present invention the method includes receiving a payment in exchange for associating the game element with a designated channel.

Moreover in accordance with a preferred embodiment of the present invention the payment is received from a payer, and the designated channel is associated with the payer.

Further in accordance with a preferred embodiment of the present invention the payer includes a channel owner and the designated channel is owned by the channel owner.

Still further in accordance with a preferred embodiment of the present invention the game element appears on the second channel to which the user is forcibly tuned.

Additionally in accordance with a preferred embodiment of the present invention the game element returns to the first channel within a predetermined time before start of a broadcast program.

Moreover in accordance with a preferred embodiment of the present invention the game element returns to the first channel within a predetermined time before start of a broadcast program after commercials.

Further in accordance with a preferred embodiment of the present invention the game element returns to the originally viewed channel within one minute before the start of the broadcast program after the commercials.

Still further in accordance with a preferred embodiment of the present invention a fixed time is set to be the duration of the game.

Additionally in accordance with a preferred embodiment of the present invention a promotional channel is made available to players of the game.

Moreover in accordance with a preferred embodiment of the present invention prizes offered include at least one of: credit towards pay-per-view purchases; authorizations to view special broadcasts or channels; and extension of rental time for PVR recorded content.

There is also provided in accordance with a preferred embodiment of the present invention an interactive multi-channel game system including a game element generator providing a first representation of a game element associated with a first channel of a multi-channel system and replacing the first representation with a second representation of the game element associated with a second channel of the multi-channel system, a clue provider providing a clue associated with the second channel, and a user input interface receiving a user input representing a user's response to the clue.

The game element generator, the clue provider and the user input interface may preferably be comprised in a set-top box (STB) or a PVR.

There is further provided in accordance with a preferred embodiment of the present invention a processor providing a first representation of a game element associated with a first channel of a multi-channel system and replacing the first representation with a second representation of the game element associated with a second channel of the multi-channel system, the processor further providing a clue associated with the second channel, and a user input interface receiving a user input representing a user's response to the clue.

The processor and the user input interface may preferably be comprised in a set-top box (STB) or a PVR.

BRIEF DESCRIPTION OF THE DRAWINGS

The present invention will be understood and appreciated more fully from the following detailed description, taken in conjunction with the drawings in which:

FIGS. 1A-1D are simplified pictorial illustrations of a multi-channel interactive game system, constructed and operative in accordance with a preferred embodiment of the present invention;

FIGS. 1E-1H are simplified pictorial illustrations of a character in the game system of FIGS. 1A-1D, showing examples of different possible graphical depictions of the character;

FIG. 2 is a simplified partly pictorial, partly block illustration of a preferred implementation of a portion of the system of FIGS. 1A-1D;

FIG. 4A-4C are simplified pictorial illustrations of game transitions, useful for understanding a portion of the method of FIG. 3;

FIGS. 6A and 6B are simplified pictorial illustrations, useful for understanding certain preferred modes of operation of the system of FIGS. 1A-1D;

FIGS. 8A-8E are simplified pictorial illustrations of an alternative preferred embodiment of the system of FIGS. 1A-1D, in which the user does not have control of the system.

DETAILED DESCRIPTION OF A PREFERRED EMBODIMENT

Reference is now made to FIGS. 1A-1D, which are simplified pictorial illustrations of a multi-channel interactive game system, constructed and operative in accordance with a preferred embodiment of the present invention.

The operation of the system of FIGS. 1A-1D is now briefly described. A television screen 20 is depicted, operatively associated with a set-top box/PVR 30. A viewer is holding a remote control 40. Various graphical elements, described below, appear on the television screen 20. In the system of FIGS. 1A-1D a graphically-depicted character 10, called "Zap", appears on the television screen 20, disappears, and reappears on a different channel. A viewer, using the remote control 40 operationally associated with the set-top box/PVR 30, preferably invokes and plays the Zap game as described in more detail below.

It is appreciated that the use of the remote control 40 is given by way of example only. For example, and without limiting the generality of the above, any other appropriate method to signal the set-top box, such as, for example, use of buttons on a set-top box/PVR 30 front panel, use of a wireless keyboard, or other methods as are well known in the art may alternatively be used.

Referring now to FIG. 1A, showing a first state of the game, Zap 10 is present. A typical channel logo 50 appears on the television screen 20.

Figure 1B:
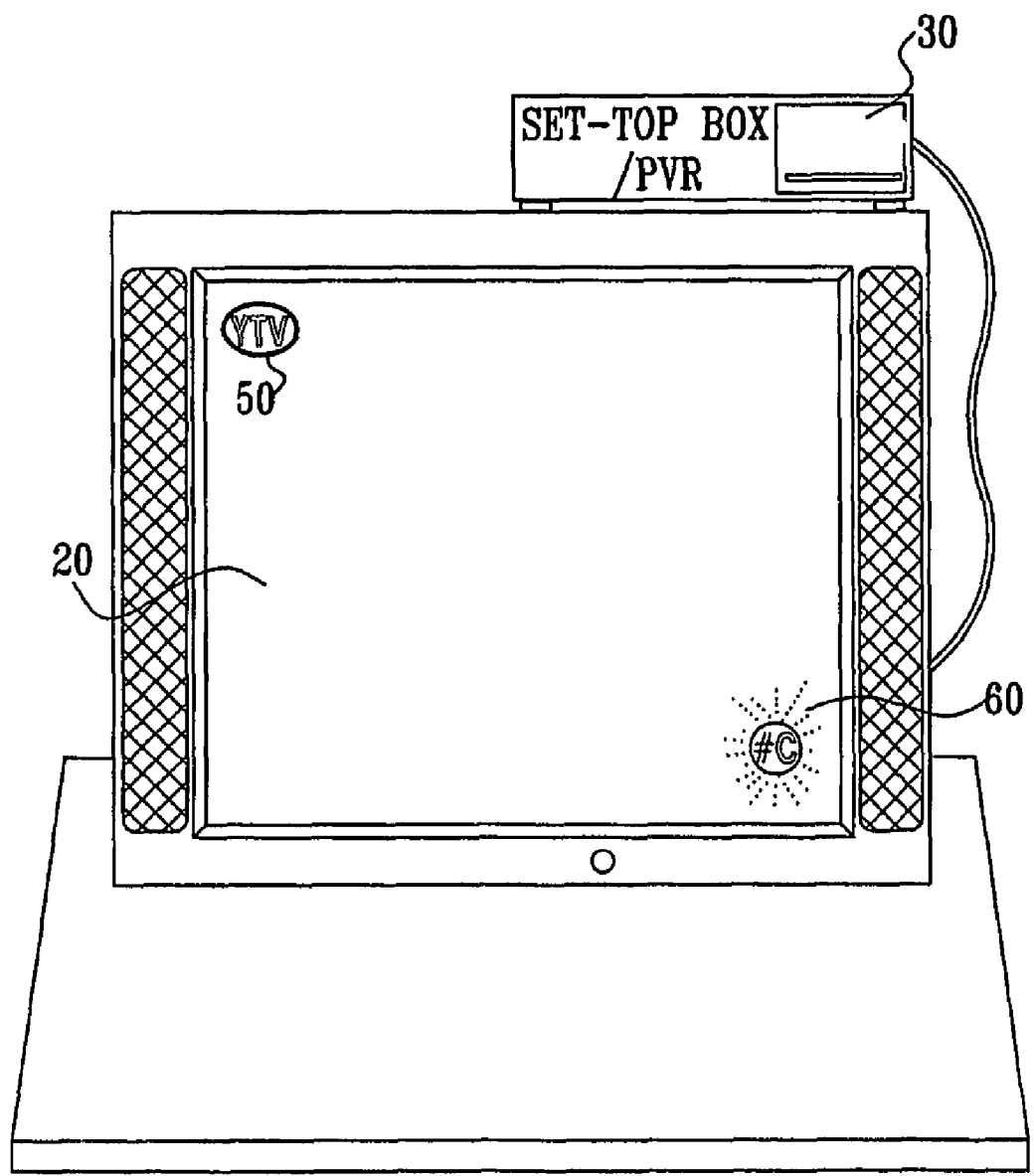

Referring now to FIG. 1B, showing a second state of the game, Zap 10 has disappeared from the television screen 20. In the place on the television screen 20 where Zap 10 was located prior to disappearing, a clue is rendered, comprising, in the case shown in FIG. 1B, a logo 60 of the next channel on which Zap 10 may be seen. Preferred embodiments of a mechanism for rendering clues is described in greater detail below.

Referring now to FIG. 1C, showing a third state of the game, Zap's disappearance, as described above with reference to FIG. 1B, provokes the user to use the remote control 40 to change channels. The clue, comprising, in the case shown in FIG. 1C, the logo 60 of the next channel remains on the television screen 20.

Figure 1D:
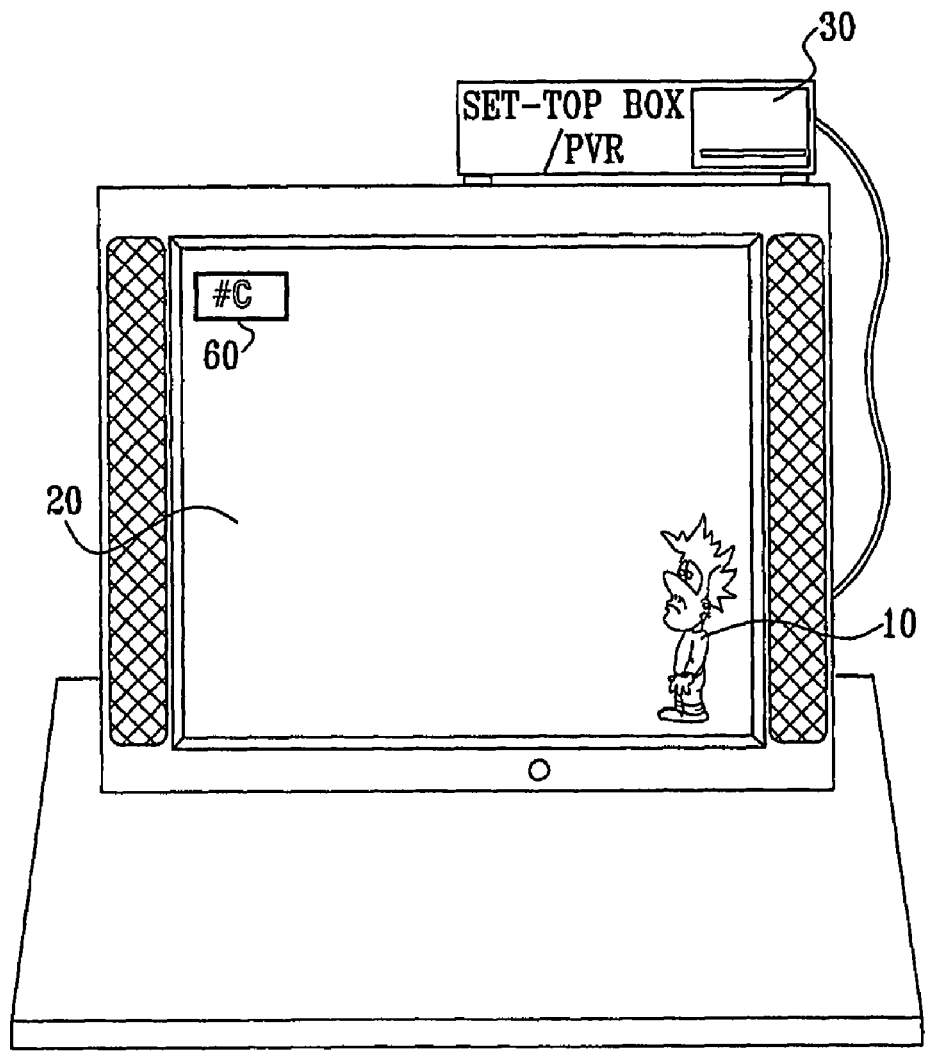

Referring now to FIG. 1D, showing a fourth state of the game, following the user initiated channel change described above with reference to FIG. 1C, Zap 10 is again rendered on the television screen 20 on a new channel, indicated by the logo 60.

Throughout the discussion of FIGS. 1A-1D the examples given are for the case where a clue is rendered after Zap 10 has left the current channel. It is appreciated that a clue can be given any time the viewer is tuned to the channel. Specifically, the clue may appear before, during or after Zap 10 has appeared or departed.

It is appreciated that the appearance of the clue may depend, at least in part, on any appropriate one or combination of the following: information from a broadcast headend; broadcast program guide information; a broadcast program; and broadcast data. The term "appearance", as used in the foregoing, refers to the form of the clue as well as to the moment of presentation of the clue on the screen. Non-limiting examples of various appearances of clues are given below in the discussion of FIGS. 4B and 4C.

Reference is now made to FIGS. 1E-1H, which are simplified pictorial illustrations of Zap 10, showing examples of different possible graphical depictions of Zap 10. Zap 10 may appear on the television screen 20 in a variety of different depictions depending on the channel and content viewed, the time of day and a period in the year. The examples provided in the descriptions of FIGS. 1E-1H are provided for illustration only, and are not meant to limit the generality of the present invention. Examples given in FIGS. 1E-1H show Zap 10 changing appearance depending on:

FIG. 1E: Channel viewed. The Sport Channel 70 is seen on the television screen 20. Zap 10 is depicted playing baseball.

FIG. 1F: Content viewed. The Music Channel 80 is seen on the television screen 20. Zap 10 is depicted singing and dancing.

FIG. 1G: Time of year. The calendar 90 shows that it is December. Zap 10 is depicted on the television screen 20 as Santa Claus.

FIG. 1H: Time of day. The clock 93 shows that it is 1:00 AM. Zap 10 is depicted on the television screen 20 asleep.

It is appreciated that a broadcaster broadcasting the Zap game would be able to request payment from content providers and channel owners for associating Zap 10 with specific content and with specific channels. Taking the example depicted in FIG. 1E, and without limiting the generality of the foregoing, the owner of the Sport Channel 70 is billed for depicting Zap 10 as playing baseball. The content provider and channel owner is billed for Zap 10 changing images such that the image is associated with specific content. For example, and without limiting the generality of the foregoing, in the embodiment of FIG. 1E, Zap 10 is depicted playing baseball during a baseball game. During a tennis game, Zap 10 would be depicted as a tennis player.

Reference is now made to FIG. 2, which is a simplified partly pictorial, partly block illustration of a preferred implementation of a portion of the system of FIGS. 1A-1D, illustrating the flow of data through the system of FIGS. 1A-1D as the game is played. The set-top box/PVR 30 receives channel related data as part of program guide data 200. The channel related data preferably includes information about: the contents of channels; channels available to the user; methods of entering or exiting a given channel; and other service and program specific information, as is well known in the art.

Additionally or alternatively, there may be dedicated data 210 broadcast exclusively to Zap, which data preferably includes information concerning Zap's next destination.

As the user views television, broadcast data 220 including Zap specific information may also be received. The Zap specific information included in the broadcast data 220 may preferably include data regarding the position and characteristics of objects in the scene and the size Zap should be relative to those objects. The Zap specific information preferably allows Zap to interact with the scene pictured on the television screen 20.

Preferably, a processor 245 in the set top box/PVR 30 provides a first representation of a game element, such as Zap 10, associated with a first channel of the multi-channel interactive game system and replaces the first representation with a second representation of the game element associated with a second channel of the multi-channel system. The processor 245 may further preferably provide a clue as discussed above which is preferably associated with the second channel.

It is appreciated that the processor may include a game element generator 250 and a clue provider 262 in which case the game element generator 250 preferably provides the first representation of the game element associated with the first channel of the multi-channel system and replaces the first representation with the second representation of the game element associated with the second channel of the multi-channel system, and the clue provider 262 preferably provides the clue associated with the second channel.

The processor 245 may preferably be operatively associated with a user input interface 270 receiving a user input representing a user's response to the clue.

Typically, the processor 245 outputs digital data 230 representing the image of Zap 10 for display on the television screen 20 as an overlay, preferably using on screen display techniques well known in the art. In analog televisions, the digital data 230 is preferably converted, for example in the set top box 30/PVR 30, to an analog form for display on the television screen 20. In digital televisions, the digital data 230 may be displayed as is or, if necessary, after appropriate conversion to a digital television format in use.

Player profile information 240 may optionally be used to control the flow of the game. Determination of where Zap 10 will appear next may be based in part on the player profile information 240. In a preferred embodiment not comprising a PVR, Zap may preferably utilize profile information to jump to a channel or advertisement of interest, based on the present profile. For example, and without limiting the generality of the foregoing, for a player whose profile indicates that he is a golfer, Zap may: take the user directly to a dedicated golf channel; take the user to a shopping channel where golf clubs are currently offered for sale; or take the user to a travel channel where a trip to historic golf courses in Scotland is currently being offered.

In a preferred embodiment on a PVR type system, Zap could appear on the shopping channel, causing a specific advertisement to be displayed just as the user tunes to the channel. In this embodiment, the selection of the specific advertisement may be based, at least in part on the user profile information 240.

Figure 3:
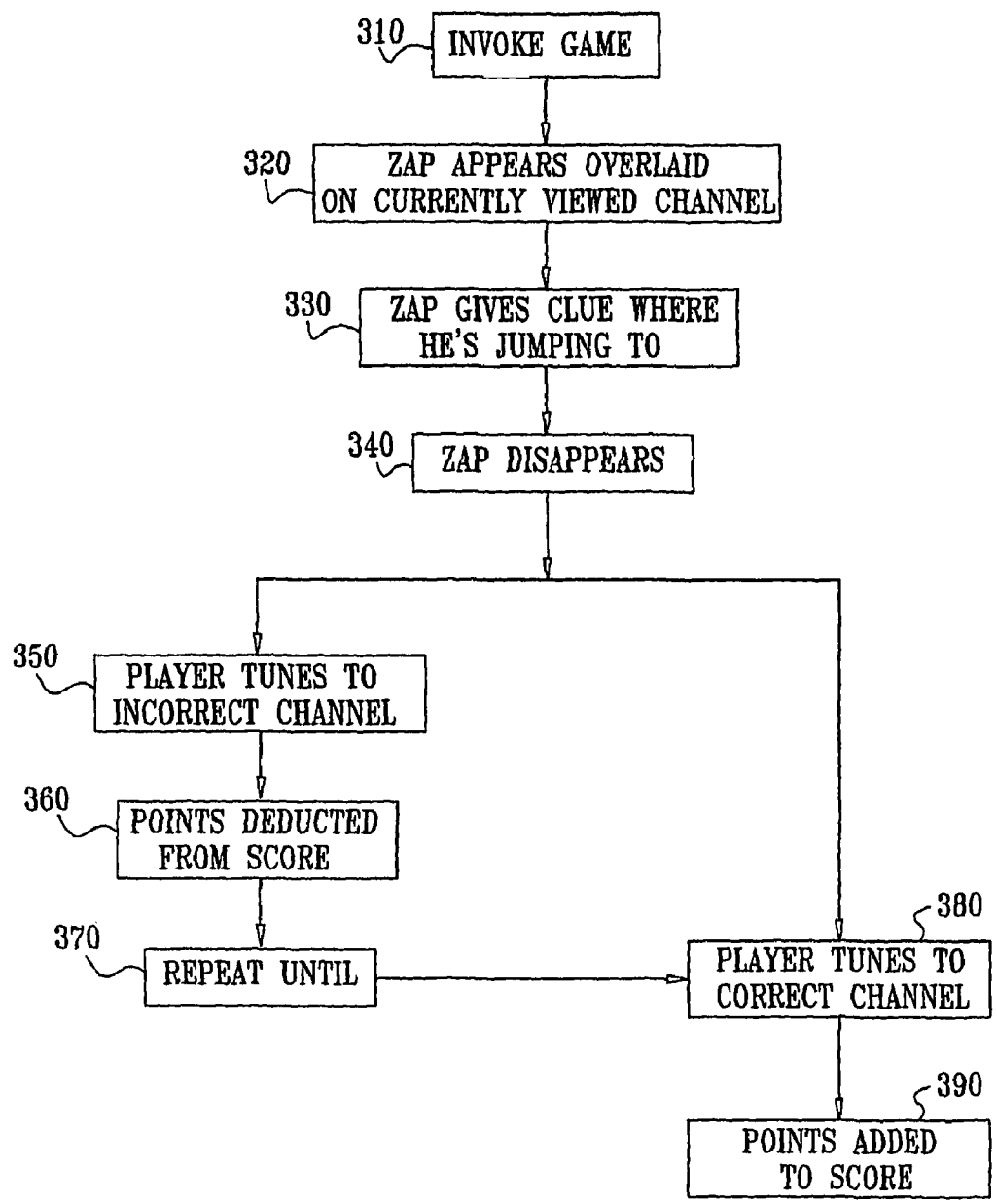
FIG. 3 is a simplified flow chart illustrating a preferred method of operation of the system of FIGS. 1A-1D.

Reference is now made to FIG. 3, which is a simplified flow chart illustrating a preferred method of operation of the system of FIGS. 1A-1D. The method of FIG. 3 preferably comprises the following steps:

A single user invokes the game (step 310). Zap appears overlaid on the currently viewed channel (step 320). Zap gives a clue to where Zap is jumping next (step 330). Zap then disappears (step 340).

Reference is now additionally made to FIGS. 4A-4C, which are simplified pictorial illustrations of game transitions, useful for understanding step 340 of FIG. 3. The transitions depicted in FIGS. 4A-4C are provided by way of example only and are not meant to be limiting.

Referring specifically to FIG. 4A, a picture within a picture 410 appears on the present video display 20; appropriate techniques for displaying a picture within a picture are well known in the art. Zap 10 exits the current video display 20 by "jumping into" the picture within a picture 410. The picture within a picture 410 may then disappear, close or shrink to nothing. Alternatively, the picture within a picture 410 could remain displayed, optionally in reduced or altered form, for a period of time, or until a specific event occurs. Nonlimiting examples of such events would be the loss of a number of points, a number of incorrect channels accessed, end of the game, or until the player has tuned to the channel represented by the picture within a picture 410.

Referring specifically to FIG. 4B, Zap 10, in the process of walking off the video display 20, is only half seen. The logo of some other channel 50 appears where Zap 10 was. Appropriate techniques for displaying an overlaid channel logo are well known in the art. It is appreciated that throughout the discussion of FIG. 4B the example given is for the case where a clue, such as but not limited to the logo of another channel, is only rendered after Zap 10 has left the current channel. It is appreciated that the clue can be given any time the viewer is tuned to the channel. Specifically, the clue may appear before, during or after Zap 10 has appeared or departed. Alternatively or additionally, Zap 10 can interact with the clue. For example, and without limiting the generality of the foregoing, Zap 10 could interact with the clue, by pointing at a logo of the channel where Zap 10 will next appear.

Referring specifically to FIG. 4C, Zap 10 gives an audio clue 420, illustrated by way of example only as "I'm off to London." The audio clue could indicate that the user should use the remote control 40 (not pictured in FIG. 4C) to look for Zap on the travel channel.

Referring back to FIG. 3, if the player tunes to an incorrect channel (step 350) points may preferably be deducted from the player's score (step 360). Steps 350 and 360 are repeated (step 370) until the player tunes to the correct channel (step 380).

If the player tunes to the correct channel (step 380), either immediately after Zap 10 disappeared from the previously viewed channel, or after at least one mistaken guess as to Zap's 10 location, points may be awarded to the player (step 390). It is appreciated that the processor 245 may preferably perform the awarding of the points.

Point count may preferably be stored in any appropriate storage such as, for example: in set-top box memory (not shown); on the hard drive of a PVR (not shown); sent back to a broadcast headend (not shown) via any appropriate return path (not shown) for storage in a central database; or any other appropriate manner. A non-limiting example of a return path, and without limiting the generality of the foregoing, would be a cable of a cable television system.

Throughout the discussion of FIG. 3 the examples given are for the case where a clue is only rendered after Zap 10 has left the current channel. It is appreciated that a clue can be given any time the viewer is tuned to the present channel. Specifically, the clue may appear before, during or after Zap 10 has appeared or departed.

Figure 5:
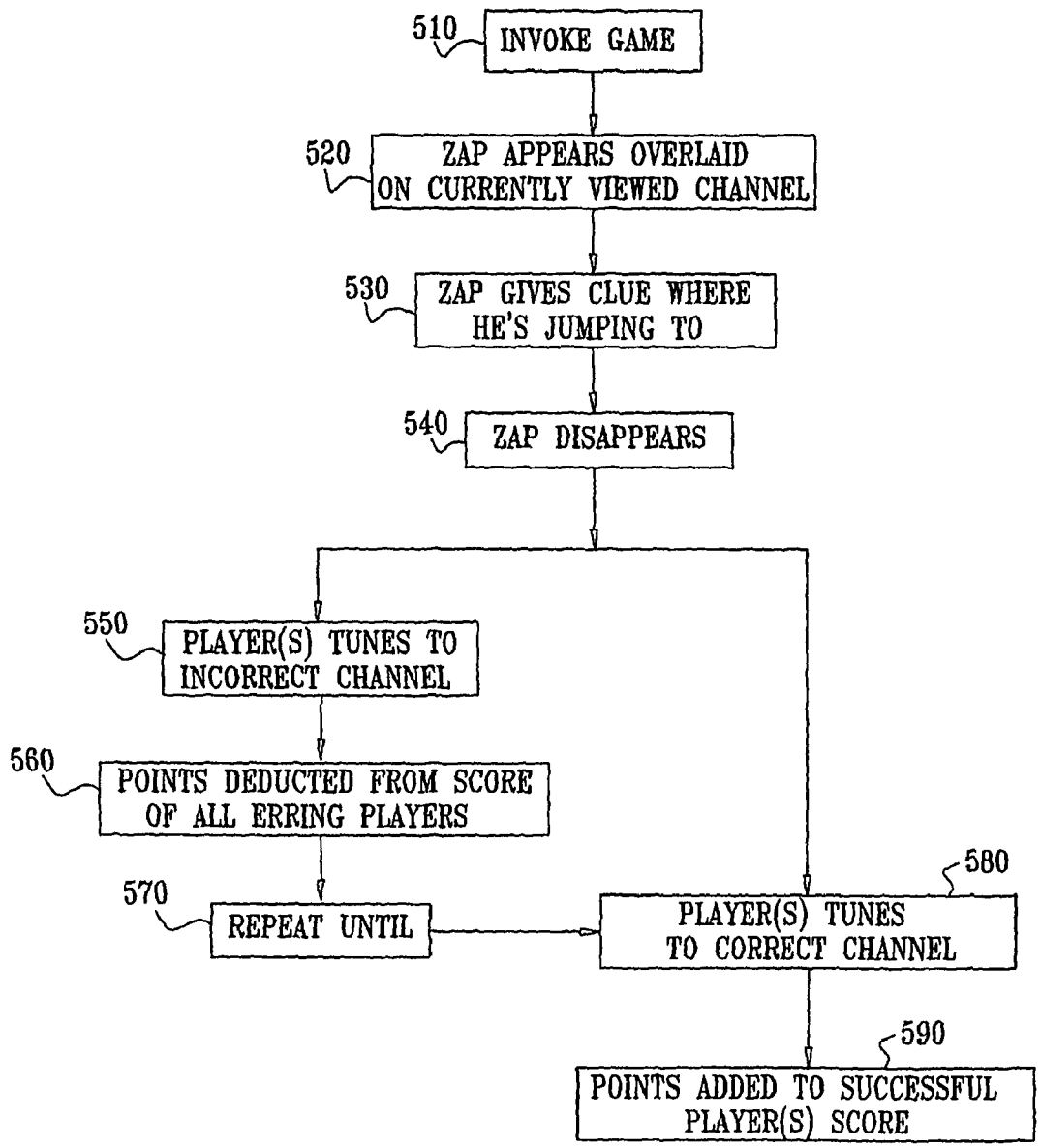
FIG. 5 is a simplified flow chart illustrating an alternative preferred method of operation of the system of FIGS. 1A-1D.

Reference is now made to FIG. 5, which is a simplified flow chart illustrating an alternative preferred method of operation of the system of FIGS. 1A-1D. The method of FIG. 5 preferably comprises the following steps:

A plurality of users each invoke the game (step 510), each on their individual television. Zap appears overlaid on the currently viewed channel (step 520). A clue to where Zap is jumping next appears (step 530). Zap then disappears (step 540).

FIGS. 4A-4C are useful for understanding step 540 of FIG. 5, just as they were useful for understanding step 340 of FIG. 3.

Each player tuning to an incorrect channel (step 550) will have points deducted from his score (step 560). Steps 550 and 560 are repeated (step 570) for each player until at least one player tunes to the correct channel (step 580).

When at least one player tunes to the correct channel (step 580), either immediately after Zap disappeared from the previously viewed channel, or after at least one mistaken guess as to Zap's location, points may preferably be awarded to that player. It is appreciated that the processor 245 may preferably perform the awarding of the points.

Point count may preferably be stored as described above with reference to FIG. 3.

The foregoing discussion of FIG. 5 deals with an embodiment of the Zap game played by a plurality of users each on their own individual television. Alternatively, a plurality of users may interact in the game on a single TV. In the present embodiment of the system of FIG. 5, players race against each other in order to earn points.

It is appreciated that when a plurality of players play the Zap game on one television, a system providing user identification must be implemented in order to distinguish one player from another. A preferred method of providing user identification is through remote-control identification; that is, each individual remote control or other device used to interact with the set-top box/PVR could transmit, along with the regular commands, a unique code or signal identifying the user, which code would be associated with a unique symbol on the screen. An example, not meant to limiting the generality of the foregoing, of a use of the remote control or other device to interact with the set-top box/PVR would be channel change. Alternatively, a unique sound could be made by the set-top box/PVR or television; that is, when a channel change is made, a symbol representing the remote control/user which first made the channel change could be displayed or a sound could be made by the set-top box/PVR or television, and/or the points for that remote control/symbol could be updated. Optionally the user could enter an identifying code into the remote control, which would be broadcast. Alternatively, each remote control could have a unique code, and the game could ask each user to type in/enter a name to associate with each signal. Alternatively, each user could play separately after entering identifying details, and the game could keep track of individual scores for each game for comparison, or the users could use an honor system and not bother with points.

Figure 6A:
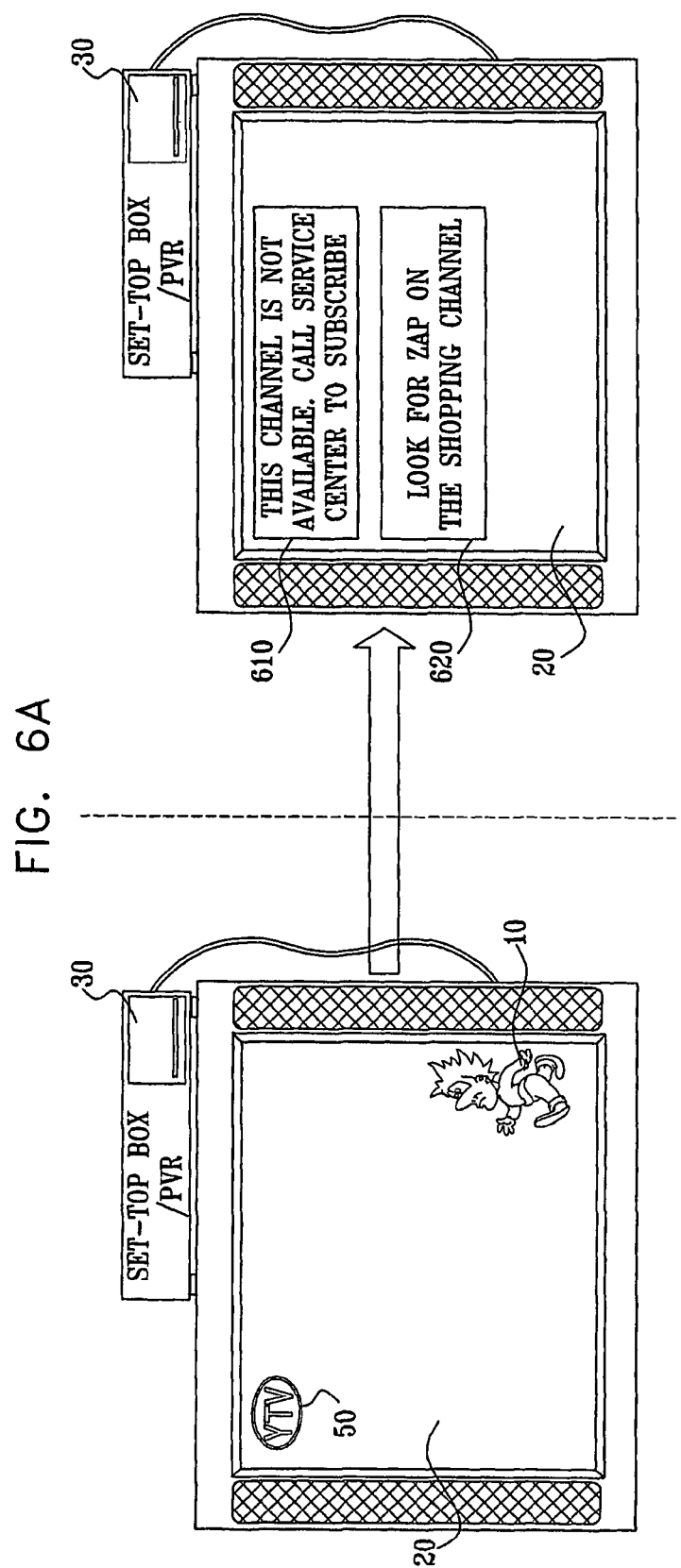

Reference is now made to FIG. 6A, which is a simplified pictorial illustration, useful for understanding certain preferred modes of operation of the system of FIGS. 1A-1D. In FIG. 6A, the user is not subscribed or otherwise entitled to view the channel to which Zap 10 jumps. As is well known in the art of pay television, under ordinary viewing circumstances, when not playing the Zap game, viewing is blocked on some channels. To view a blocked channel, a subscription or entitlement would need to be purchased, as is well known in the art of conditional access. When playing the Zap game, it is possible that a user is not subscribed or otherwise entitled to view the channel on which Zap is presently found.

In the example of FIG. 6A, an on-screen display 610 appears, notifying the user that the current channel is not viewable. Preferably, an offer to subscribe is made as part of the on-screen display 610, which offers are well known in the art. Another on-screen display 620 appears, giving the next hint about Zap's location.

Additionally or alternatively, promotional material, which could be audio, video or audio/video in nature could be provided to the user. In one preferred embodiment, the promotional material would be available only for viewers who are playing the Zap game. A promotional channel could broadcast promotional material exclusively for Zap game users. Upon tuning to the non-authorized channel, users could be retuned to the promotional channel. Alternatively, users could be given authorizations making it possible to tune to and view the promotional channel. As is well known in the art, the broadcaster may limit the viewing time of users viewing the promotional channel when viewing from a non-subscribed viewing system.

Reference is now made to FIG. 6B, which is a simplified pictorial illustration, useful for understanding certain preferred modes of operation of the system of FIGS. 1A-1D, wherein the user is not subscribed or otherwise entitled to view the channel to which Zap 10 jumps. In the embodiment of FIG. 6B, Zap 10 gives an audio cue 650 to the user, preferably offering the user an opportunity to interactively subscribe to the next channel.

In another preferred embodiment (not shown) Zap could be configured to never jump to a channel to which the user is not subscribed. Alternatively, if Zap jumps to a channel to which the user is not subscribed, the user would not get any points until he "catches up" with Zap. For example, and without limiting the generality of the foregoing, the user would not get any points until the user subscribes to the channel and views the channel or is forcibly tuned to the channel. Optionally the user could be awarded points for subscribing to the channel, or have points deducted unless or until he subscribes.

Figure 7:
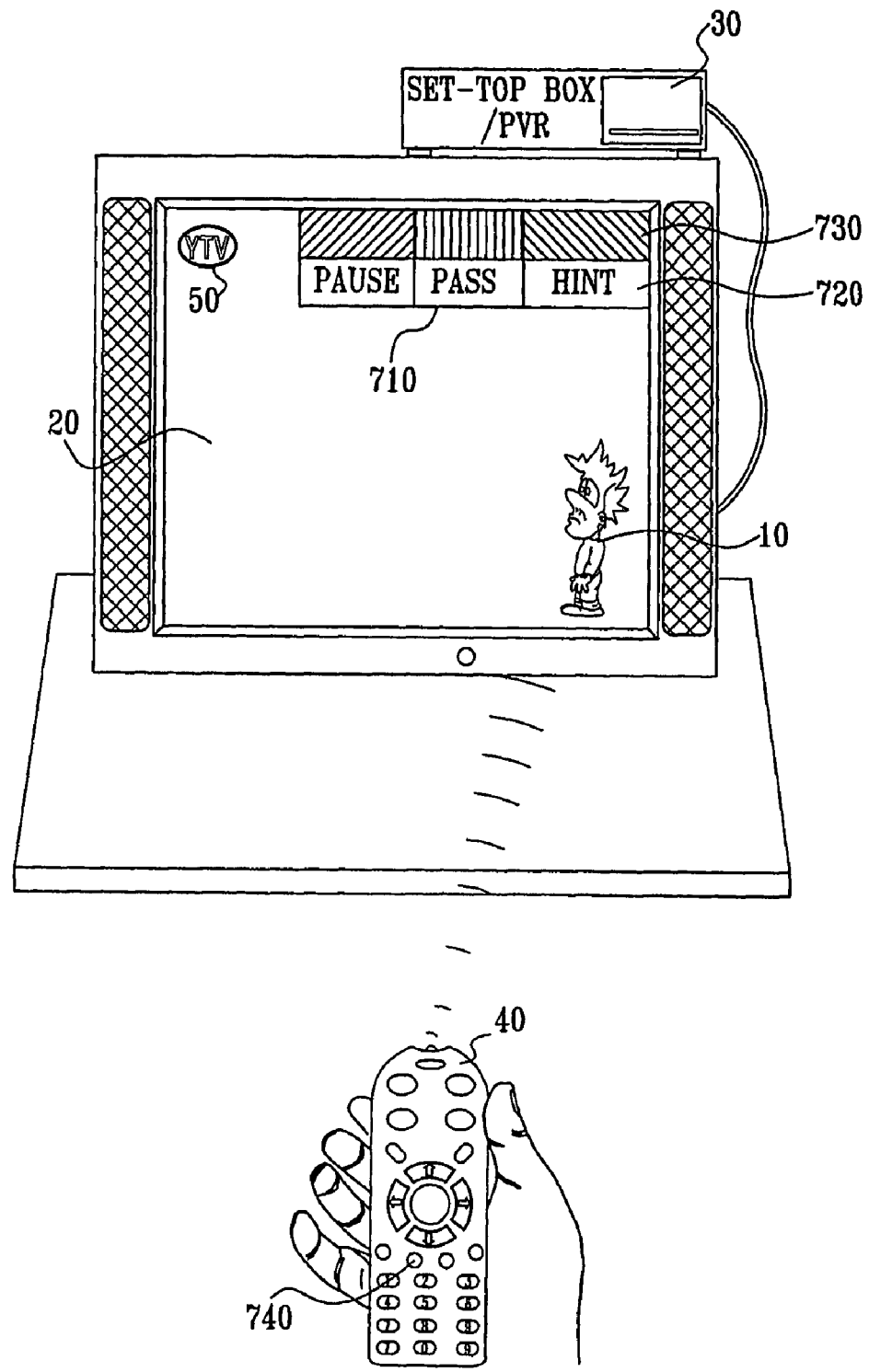
FIG. 7 is a simplified pictorial illustration, useful for understanding certain additional preferred modes of operation of the system of FIGS. 1A-1D.

Reference is now made to FIG. 7, which is a simplified pictorial illustration, useful for understanding certain additional preferred modes of operation of the system of FIGS. 1A-1D.

A legend 710 appears on the screen 20. The legend 710 preferably comprises text 720 indicating an option for the user. The legend 710 also preferably comprises an indication 730 of a key of the remote control 40, which key corresponds to the option indicated by the text 720.

It is appreciated that the use of the remote control 40 is given by way of example only. For example, and without limiting the generality of the above, any other appropriate method to signal the set-top box, such as, for example use of buttons on a set-top box/PVR 30 front panel, use of a wireless keyboard, or other methods as are well known in the art may alternatively be used.

For example, a remote control key 740 corresponds to Pause, as displayed on the legend 710 on the screen 20. Pressing the remote control key 740 preferably allows the user to remain on the channel of interest, and continue the game later.

Some non-limiting examples of such user options, shown as text 720, include the following:

a) Pause: allows a user to remain on the channel of interest and continue the game at a later time.

b) Pass: allows a user to jump directly to the channel where Zap is currently located. Alternatively, the user could remain on the current channel or be forcibly tuned to a default channel/display and receive a new set of clues, preferably for a completely different channel. The alternative may be useful in cases where the user is not subscribed to an original destination channel, and chooses not to subscribe to the original destination channel. The user could be penalized points for passing.

c) Additional hint: may charge a certain number of points to give an additional hint where Zap is located. Alternatively, the hint feature could be time based. While playing the game the longer the viewer stays on the same channel and does not go to the next channel, the more hints are provided and the number of points awarded for actually locating Zap goes down.

It is appreciated that the options "pause", "pass", and "additional hint" are given as examples, and any other appropriate option may additionally or alternatively be provided. It is further appreciated that that the processor 245 may preferably perform the pausing, passing and providing the additional hint.

Reference is now made to FIGS. 8A-8E, which are simplified pictorial illustrations of an alternative preferred embodiment of the system of FIGS. 1A-1D, in which the user does not have control of the system. In the system of FIGS. 8A-8E, the broadcaster or content owner may take control of the channel change mechanism. FIGS. 8A-8E are intended to illustrate an event occurring as time passes. The passage of time in FIGS. 8A-8E is indicated by a digital clock shown in each of the figures.

Figure 8A:
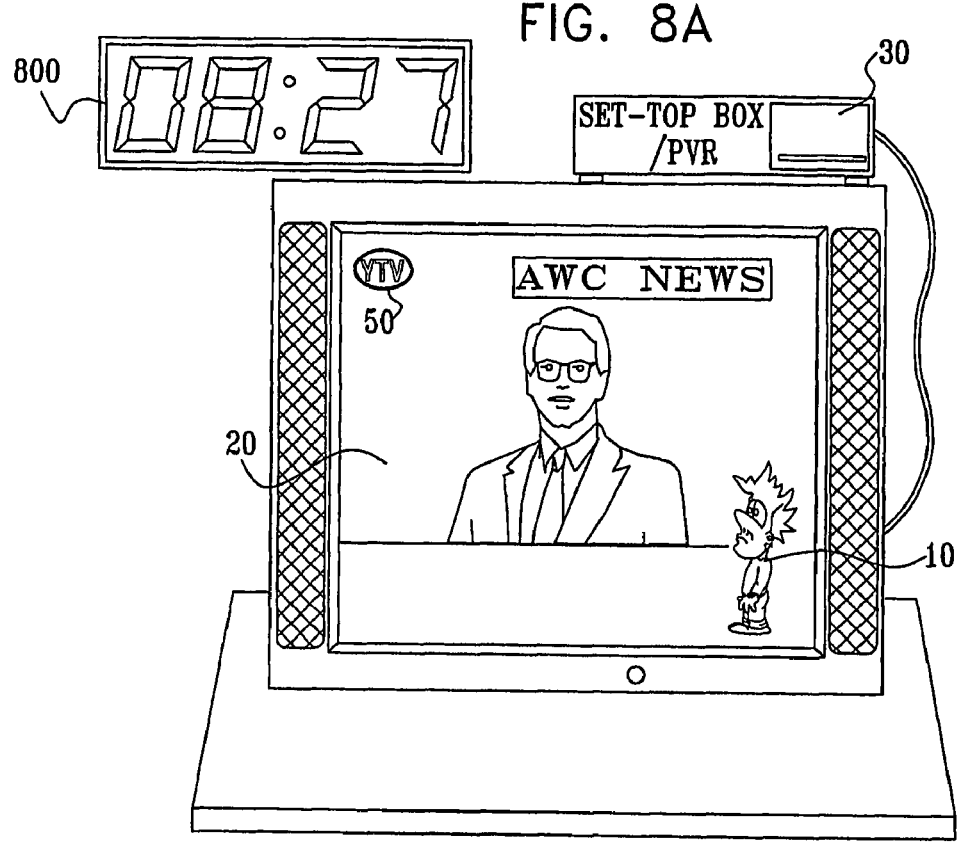

Referring specifically to FIG. 8A, Zap 10 appears on the television screen 20. The channel logo 50 indicates the particular channel viewed. A digital clock display 800 indicates the present time.

Figure 8B:
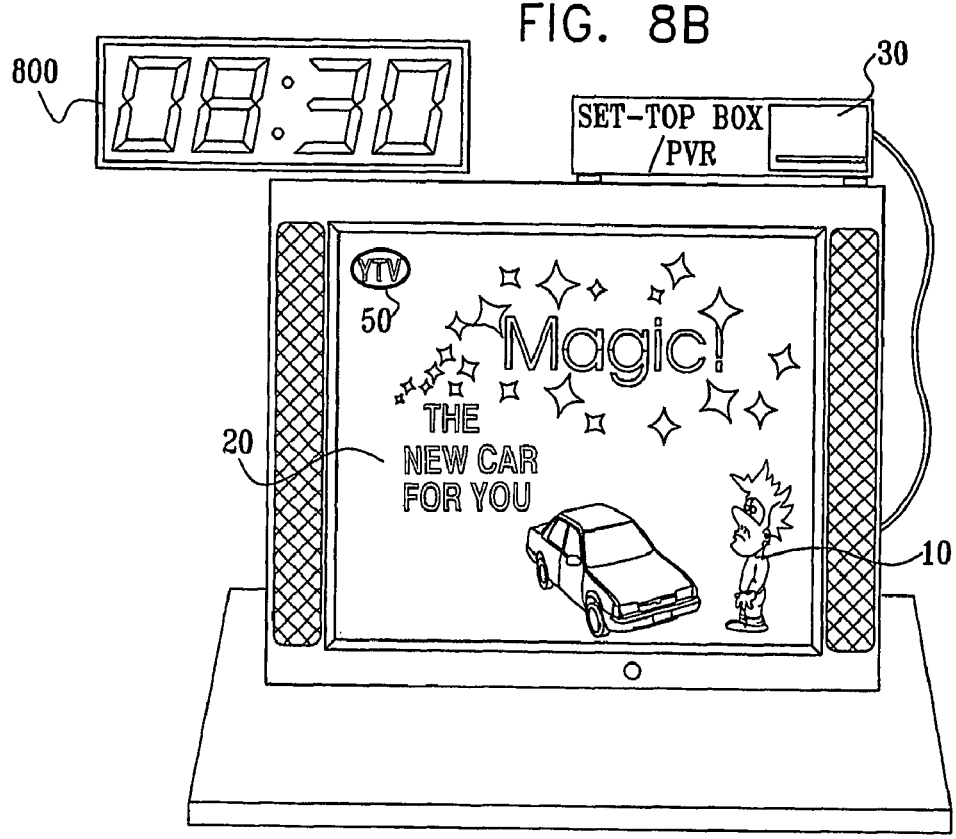

Referring specifically to FIG. 8B, at half past the hour, as indicated on the digital clock display 800, a commercial appears on the television screen 20. As is known in the art of television broadcast, a broadcaster who controls a larger share of the total viewing audience is able to charge advertisers more for advertisement time on his broadcast network. During advertisements, a broadcaster is at risk of losing audience members who either change the channel or surf to other channels and who do not return to an original channel. In order to not lose a share of the viewing audience, the broadcaster or content owner does not want the viewer to change to a different channel. The inventors of the present invention believe that a far better solution, as far as the broadcaster or content owner is concerned, is to have the viewer forcibly tuned to some other channel or group of channels owned by the broadcaster or content owner. When the advertisements are about to end, the viewer can then be forcibly tuned back to the original channel.

In the embodiment of FIGS. 8A-8E, Zap 10 jumps to a different channel, thereby forcibly tuning the viewer to that channel. In certain preferred embodiments of the system depicted in FIGS. 8A-8E, users have no control of the channel change mechanism whatsoever. In an alternative embodiment the user may be able to specify in advance to which channels he would like to be forcibly tuned to when an event, such as advertisements, occur. For example, and without limiting the generality of the foregoing, the user could ask to be tuned to a news channel when certain events occur. One option could be to allow the user to request forced tuning, but to limit the user's choices. For example, and without limiting the generality of the foregoing, a content owner of a film channel could provide a list of forced tuning sites to which the user could ask to be forcibly tuned. Alternatively or additionally to the above embodiments of the system depicted in FIGS. 8A-8E, although the Zap game will begin to forcibly tune the users to preferred channels, the users may exit the Zap game by changing channels.

Referring specifically to FIGS. 8C and 8D, the digital clock display 800 indicates the passage of time. In FIG. 8C it is now 8:32. In FIG. 8D it is now 8:35. In the sequence shown in FIGS. 8A, 8C and 8D, there is some relationship between the channels tuned to. The channel logo 50 has changed between each of the FIGS. 8A, 8C and 8D. However, the channel logo 50 text changes from YTV in FIG. 8A to YTW in FIG. 8C and YTX in FIG. 8D indicating that there may preferably be a relationship between these channels. A non-limiting example of such a relationship may be that the same content provider owns all three of these channels. Alternatively, these channels may have no relationship other than that the respective content provider of each of these channels are paying to have the viewer forcibly tuned to their channels.

Figure 8E:
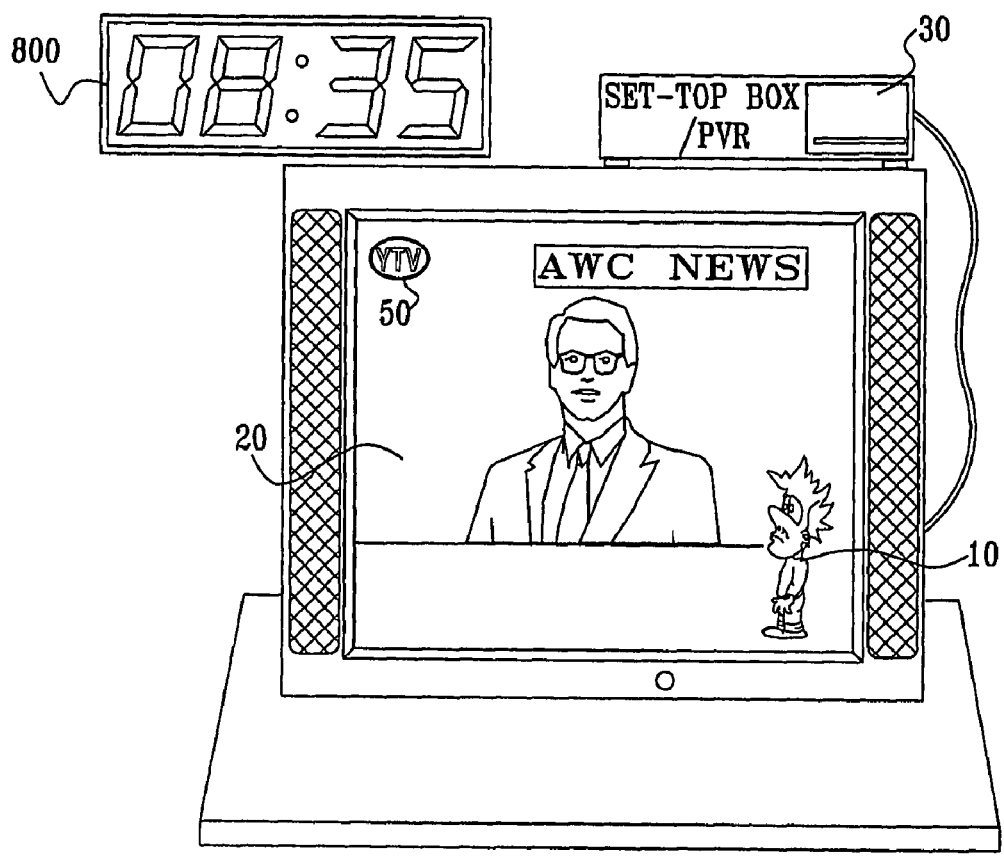

Reference is now made to FIG. 8E, in which the digital clock display 800 indicates that 5 minutes has passed since the start of the commercials on the originally viewed channel, as indicated by the channel logo 50 returning to the original logo text YTV. It is appreciated that the textual example of various channel logos 50 indicated in the system of FIGS. 8A-8E is given as an example, and any other appropriate channel logo may be used, as is well known in the art.

It is appreciated that the system of FIGS. 8A-8E is not meant to be limiting. Forced tuning may be used in other contexts within the Zap game as well. For example, when a player or players of the Zap game do not find the destination channel within a time limit, that player or players can be forcibly tuned to the correct channel. Another example would be when the player or players of the Zap game do not find the destination channel and press the remote control 40 key for pass 740, the player or players are preferably forcibly tuned to the destination channel.

Figure 9:
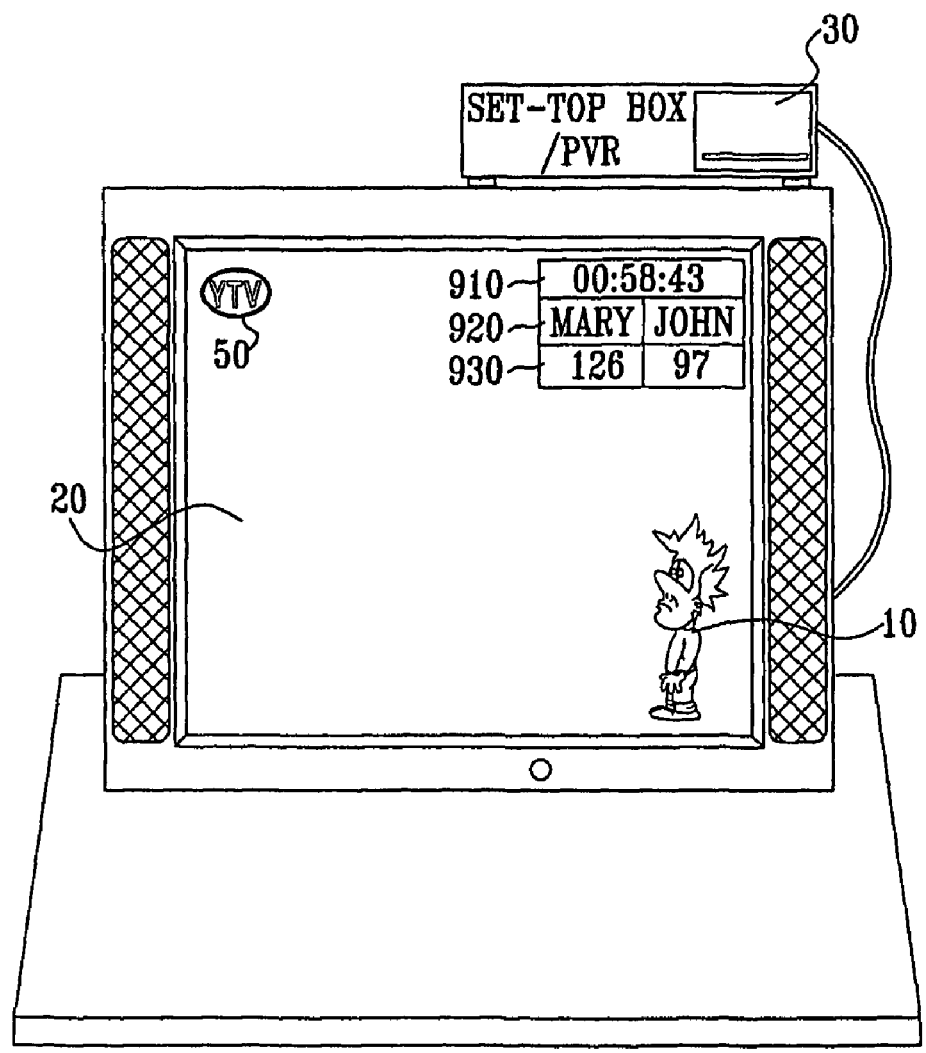
FIG. 9 is a simplified pictorial illustration of another preferred implementation of the system of FIGS. 1A-1D.

Reference is now made to FIG. 9, which is a simplified pictorial illustration of another preferred embodiment of the system of FIGS. 1A-1D. In the system of FIG. 9 Zap 10 appears on the television screen 20. The user controls the progress of the game by sending commands, using the remote control 40, to the set-top box/PVR 30. A typical channel logo 50 appears on the television screen 20. A timer 910 also appears on the television screen 20. The timer 910 indicates elapsed game time.

In certain preferred embodiments, the Zap game may be played for an amount of time agreed upon by the users, and configured as part of game set-up. In alternative preferred embodiments, the Zap game itself may be configured to only last for a given duration. It is appreciated that when the game is played for a duration set at, or prior to, the start of the game, that the timer 910 may alternatively indicate remaining game time. It is also appreciated that although the timer 910 is illustrated as a digital clock display, other methods known to symbolically represent the passage of time may also be used. For example, and without limiting the generality of the foregoing, an analog clock face or a progress bar that either lengthens or shrinks as appropriate could alternatively be used to show the passage of game time.

It is further appreciated that the progression of the timer 910 need not be linear. For example, while on a channel an indicator may stop, slow down or speed up while the user completes a task, such as watching an advertisement. Using the pause option may also affect the speed of the timer 910. The passage of game time may also be slowed or stopped while users remain on a channel awaiting the next clue.

When playing on a PVR additional options may affect the progress of the timer 910. Three such options are described below.

1. Rewind of game: while playing the game, users may preferably be allowed to rewind the game. For example, users may rewind to an earlier stage of the game. In addition, if at the first iteration of a stage of the game an advertisement for a product was shown, at the next iteration of that stage of the game, as is well known in the art of PVRs, a different advertisement could be shown, either for the same product or alternatively for a different product. One particular example of such a system for controlling advertisements in an end-user controlled playback environment is described in WO 01/52541 published PCT Patent Application of NDS Limited, the disclosure of which is hereby incorporated herein by reference. Similarly, different or additional clues may be provided for each iteration. Rewinding would not reverse any of the time indicators, although it could affect the rate of time indicator progress.

2. Pause of live material: timers could be stopped or unaffected. Alternatively, the rate of progression of timers could be slowed or otherwise changed during pause of live material.

3. Fast Forward: may affect the rate of progress of timer indicators. Time indicators may preferably speed up in accordance with the speed of the video. Alternatively, time indicators may retain their normal speed even while fast forward is in use.

In addition or as an alternative to the factors already discussed involving awarding or deducting of points such as occurrence or nonoccurrence of specific events, the awarding or deducting of points could be subject to the passage of time, and thereby also subject to the same factors discussed above regarding adjustments of the timers, such as time spent by users awaiting a next clue and use of PVR options.

Returning to the discussion of FIG. 9, names 920 of the users appear on the television screen 20. Beneath each name 920 is the score 930 of that user. As the game progresses, the score is incremented and decremented as appropriate. Alternatively, a symbol or icon may appear for each user instead of the name of the user.

It is appreciated that the timer 910 and scoreboard 930 are shown together in FIG. 9 for illustrative purposes only. In other implementations of the game the timer 910 and scoreboard 930 may appear independently of each other, or may appear in combination with other game elements described above, such as the Pause/Pass/Hint controls described with regard to FIG. 7.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A system for an interactive multi-channel game played on an interactive multi-channel television system, the system comprising:
    a multi-channel game invoker, the multi-channel game being associated with the multi-channel television system;
    a game element generator providing a first representation of a game element associated with a first channel of a multi-channel television system;
    a clue provider providing a clue associated with a second channel of the multi-channel television system;
    a game element remover operative to remove the first representation of the game element; and
    a score keeper operative to:
        deduct points from a score associates with a player of the game each time the player tunes to an incorrect channel; and
        add points to the player's score when the player tunes to the second channel.

2. A system for an interactive multi-channel game played on an interactive multi-channel television system, the system comprising:
    a processor providing a first representation of a game element associated with a first channel of a multi-channel television system and replacing the first representation with a second representation of the game element associated with a second channel of the multi-channel television system, the processor further providing a clue associated with the second channel; and
    a player input interface receiving a player input representing a player's response to the clue.

3. A method for an interactive multi-channel game played on an interactive multi-channel system, the method comprising:
    invoking a multi-channel game associated with a multi-channel system;
    providing a first representation of a game element associated with a first channel of the multi-channel system;
    providing a clue associated with a second channel;
    removing the first representation of the game element associated with the first channel of the multi-channel system; and
    performing at least one of:
        each time a player tunes to an incorrect channel, deducting points from a score associated with the player; and
        if the player tunes to the second channel, adding points to the score,
    wherein at least one player input is received, said player input representing a response of a corresponding player of a plurality of players to the clue.

4. The method according to claim 3 wherein each said player input comprises a channel change signal from the player.

5. The method according to either claim 3 further comprising rendering at least one of the first representation and the clue sensible to at least one human sense.

6. The method according to claim 5 wherein the rendering comprises visual rendering.

7. The method according to claim 5 wherein the rendering comprises audio rendering.

8. The method according to claim 5 wherein the rendering comprises audio-visually rendering.

9. The method according to claim 3 further comprising awarding at least one point based, at least in part, on performance of a first player of the plurality of players compared to performance of a second player of the plurality of players.

10. The method according to claim 3 wherein the at least one player input comprises a channel change signal from the player.

11. The method according to claim 10 further else comprising deducting at least one point for incorrect channel changes.

12. The method according to claim 10 further comprising deducting at least one point for lack of speed.

13. The method according to claim 3 further comprising pausing the game based at least in part on a received player input.

14. The method according to claim 3 further comprising providing another clue based at least in part on a received player input.

15. The method according to claim 3 further comprising passing a current turn based at least in part on a received player input.

16. The method according to claim 3 wherein at least one of the following depends on a player profile:
behavior of the represented game element;
the replacing the first representation of the game element with the second representation of the game element;
the clue; and
the response to the input of at least one of a plurality of players.

17. The method according to claim 3 wherein the second channel is selected from among a plurality of channels which at least one of a plurality of players is authorized to view.

18. The method according to claim 3 wherein the second channel is selected from among a plurality of channels at least one of a plurality of players is not authorized to view.

19. The method according to claim 3 wherein the providing a clue comprises:
receiving information from broadcast program guide information; and displaying the clue based, at least in part, on the information.

20. The method according to claim 3 wherein the providing a clue comprises:
receiving information from broadcast data; and
displaying the clue based, at least in part, on the information.

21. The method according to claim 3 further comprising:
receiving a payment for playing the game,
wherein the payment is received from the player.

22. The method according to claim 3 further comprising:
receiving a payment in exchange for associating the game element with designated content.

23. The method according to claim 3 further comprising:
receiving a payment in exchange for associating the game element with a designated channel.

24. A system for an interactive multi-channel game played on an interactive multi-channel system, the system comprising:
a multi-channel game invoker, the multi-channel game being associated with the multi-channel system;
a game element generator providing a first representation of a game element associated with a first channel of the multi-channel system;
a clue provider providing a clue associated with a second channel of the multi-channel system;
a game element remover operative to remove the first representation of the game element; and
a score keeper operative to:
deduct points from a score associated with a player of the game each time the player tunes to an incorrect channel; and
add points to the player's score when the player tunes to the second channel,
wherein at least one player input is received, said player input representing a response of a corresponding player of a plurality of players to the clue.

25. A system for an interactive multi-channel game played on an interactive multi-channel system, the system comprising:
means for invoking a multi-channel game associated with a multi-channel system;
means for providing a first representation of a game element associated with a first channel of the multi-channel system;
means for providing a clue associated with a second channel;
means for removing the first representation of the game element associated with the first channel of the multi-channel system; and
means for performing at least one of:
each time a player tunes to an incorrect channel, deducting points from a score associated with the player; and
if the player tunes to the second channel, adding points to the score,
wherein at least one player input is received, said player input representing a response of a corresponding player of a plurality of players to the clue.

* * * * *